US010575001B2

(12) United States Patent
Ström et al.

(10) Patent No.: US 10,575,001 B2
(45) Date of Patent: Feb. 25, 2020

(54) PIXEL PRE-PROCESSING AND ENCODING

(71) Applicant: Telefonaktiebolaget LM Ericsson (publ), Stockholm (SE)

(72) Inventors: Jacob Ström, Stockholm (SE); Kenneth Andersson, Gävle (SE); Martin Pettersson, Vallentuna (SE); Jonatan Samuelsson, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 23 days.

(21) Appl. No.: 15/505,509

(22) PCT Filed: May 10, 2016

(86) PCT No.: PCT/SE2016/050418
§ 371 (c)(1),
(2) Date: Feb. 21, 2017

(87) PCT Pub. No.: WO2016/186547
PCT Pub. Date: Nov. 24, 2016

(65) Prior Publication Data
US 2018/0160127 A1    Jun. 7, 2018

Related U.S. Application Data

(60) Provisional application No. 62/164,858, filed on May 21, 2015.

(51) Int. Cl.
*H04N 19/186* (2014.01)
*G09G 5/02* (2006.01)
(Continued)

(52) U.S. Cl.
CPC ............ *H04N 19/186* (2014.11); *G09G 5/02* (2013.01); *H04N 19/132* (2014.11);
(Continued)

(58) Field of Classification Search
CPC .. H04N 19/186; H04N 19/182; H04N 19/132; H04N 19/85; H04N 19/86;
(Continued)

(56) References Cited

U.S. PATENT DOCUMENTS 7,973,802 B1   7/2011 Tynefield et al.
2011/0255101 A1  10/2011 Edge
(Continued)

FOREIGN PATENT DOCUMENTS

WO    2014130343 A2    8/2014

OTHER PUBLICATIONS

Francois, E. et al., "About using a BT.2020 container for BT.709 content", International Organization for Standardization, ISO/IEC JTC1/SC29WG11, Coding of moving pictures and audio, MPEG2013/M35255 110th MPEG meeting, Strasbourg, France, Oct. 2014, 1-14.
(Continued)

*Primary Examiner* — Christopher S Kelley
*Assistant Examiner* — Nasim N Nirjhar
(74) *Attorney, Agent, or Firm* — Murphy, Bilak & Homiller, PLLC

(57) ABSTRACT

A pixel pre-processing comprises subsampling a linear color in a first color space to obtain a subsampled linear color in the first color space. A first transfer function is applied to the subsampled linear color in the first color space to obtain a subsampled non-linear color in the first color space. A first color transform is applied to the subsampled non-linear color in the first color space to obtain a subsampled first non-linear chroma component value and/or a subsampled second non-linear chroma component value in a second color space. A non-linear luma component value in the second color space is derived for the pixel, which together with the subsampled non-linear chroma component values
(Continued)

represent a color the pixel. The pre-processing reduces chroma artifacts that may otherwise occur when chroma subsampling is performed following application of the first transfer function and the first color transform.

6 Claims, 13 Drawing Sheets

(51) Int. Cl.
*H04N 19/86* (2014.01)
*H04N 19/85* (2014.01)
*H04N 19/132* (2014.01)
*H04N 19/182* (2014.01)
*H04N 19/59* (2014.01)

(52) U.S. Cl.
CPC ........... *H04N 19/182* (2014.11); *H04N 19/59* (2014.11); *H04N 19/85* (2014.11); *H04N 19/86* (2014.11); *G09G 2320/0233* (2013.01); *G09G 2320/0242* (2013.01); *G09G 2340/06* (2013.01)

(58) Field of Classification Search
CPC .................. G09G 5/02; G09G 2340/06; G09G 2320/0242; G09G 2320/0233
See application file for complete search history.

(56) References Cited

U.S. PATENT DOCUMENTS

| | | |
|---|---|---|
| 2011/0316973 A1 | 12/2011 | Miller et al. |
| 2013/0321678 A1 | 12/2013 | Cote et al. |
| 2013/0321700 A1 | 12/2013 | Cote et al. |
| 2015/0237322 A1 | 8/2015 | Stec et al. |
| 2016/0005349 A1* | 1/2016 | Atkins ..................... H04N 5/20 345/591 |
| 2016/0366422 A1* | 12/2016 | Yin ....................... H04N 19/117 |
| 2018/0007392 A1* | 1/2018 | Lasserre ................. H04N 19/98 |

OTHER PUBLICATIONS

Francois, E. et al., "About using a BT.2020 container for BT.709 content", International Organization for Standardization, ISO/IEC JTC1/SC29WG11, Coding of moving pictures and audio, MPEG2013/M35255 Strasbourg, France, Abstract, Oct. 2014, 1.

Luthra, Ajay et al., "Call for Evidence (CfE) for HDR and WCG Video Coding", International Organisation for Standardisation ISO/IEC JTC1/SC29/WG11 Coding of Moving Pictures and Audio MPEG2014/N15083 Geneva, Switzerland, Feb. 2015, 1-54.

Luthra, Ajay et al., "Test sequences and anchor generation for HDR and Wide Gamut Content Distribution", International Organisation for Standardisation ISO/IEC JTC1/SC29/WG11 Coding of Moving Pictures and Audio MPEG2014/N14548 Sapporo, Japan, Jul. 2014, 1-14.

Strom, Jacob et al., "Ericsson's Response to CfE for HDR and WCG", International Organisation for Standardisation Coding of Moving Pictures and Audio, ISO/IEC JTC1/SC29/WG 11, Ericsson, Geneva, Switzerland, Feb. 2015, 1-11.

Strom, Jacob et al., "Investigation of HDR colour subsampling Input contribution to TM-AVC", Ericsson, London, United Kingdom, Mar. 4-5, 2015, 1-6.

Tourapis, A. M. et al., "Deblocking in HEVC: Some observations from the HDR/WCG CfE", Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, 1-6.

Unknown, Author, "Candidate Test Model for HEVC extension for HDR and WCG video coding", International Organisation for Standardisation Coding of Moving Pictures and Audio, ISO/IEC JTC1/SC29/WG 11, Geneva, Switzerland, Oct. 2015, 1-10.

* cited by examiner

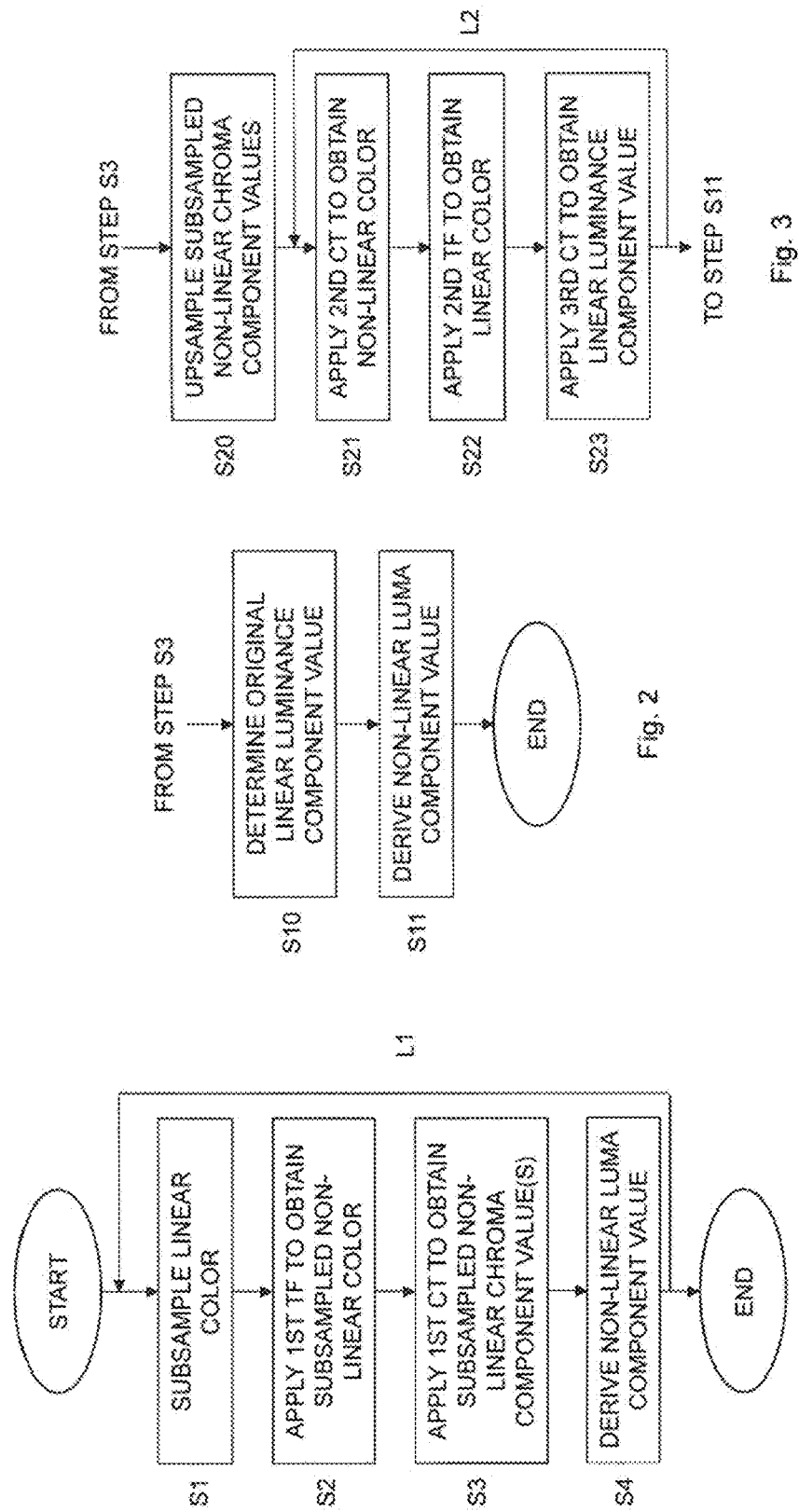

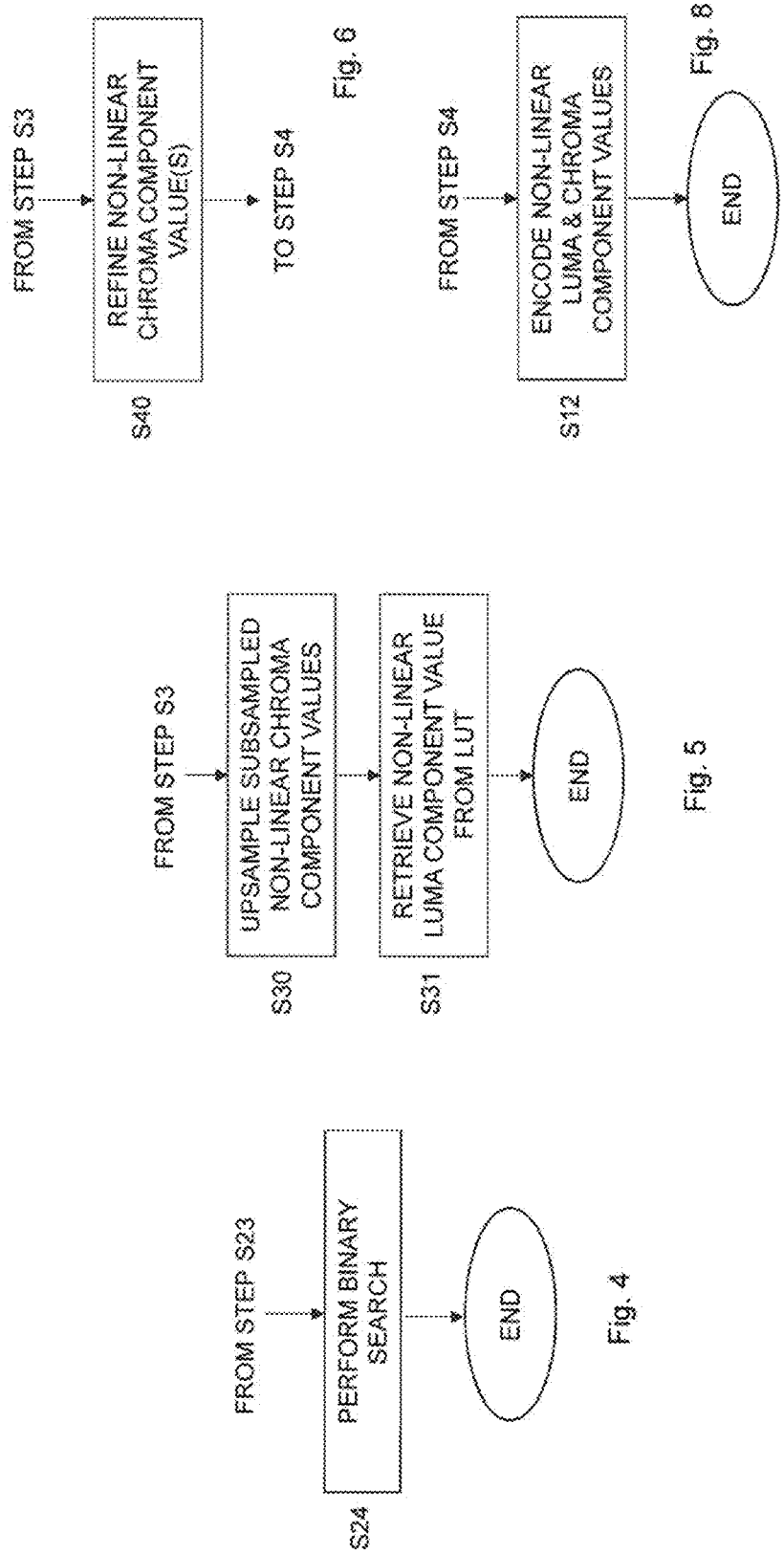

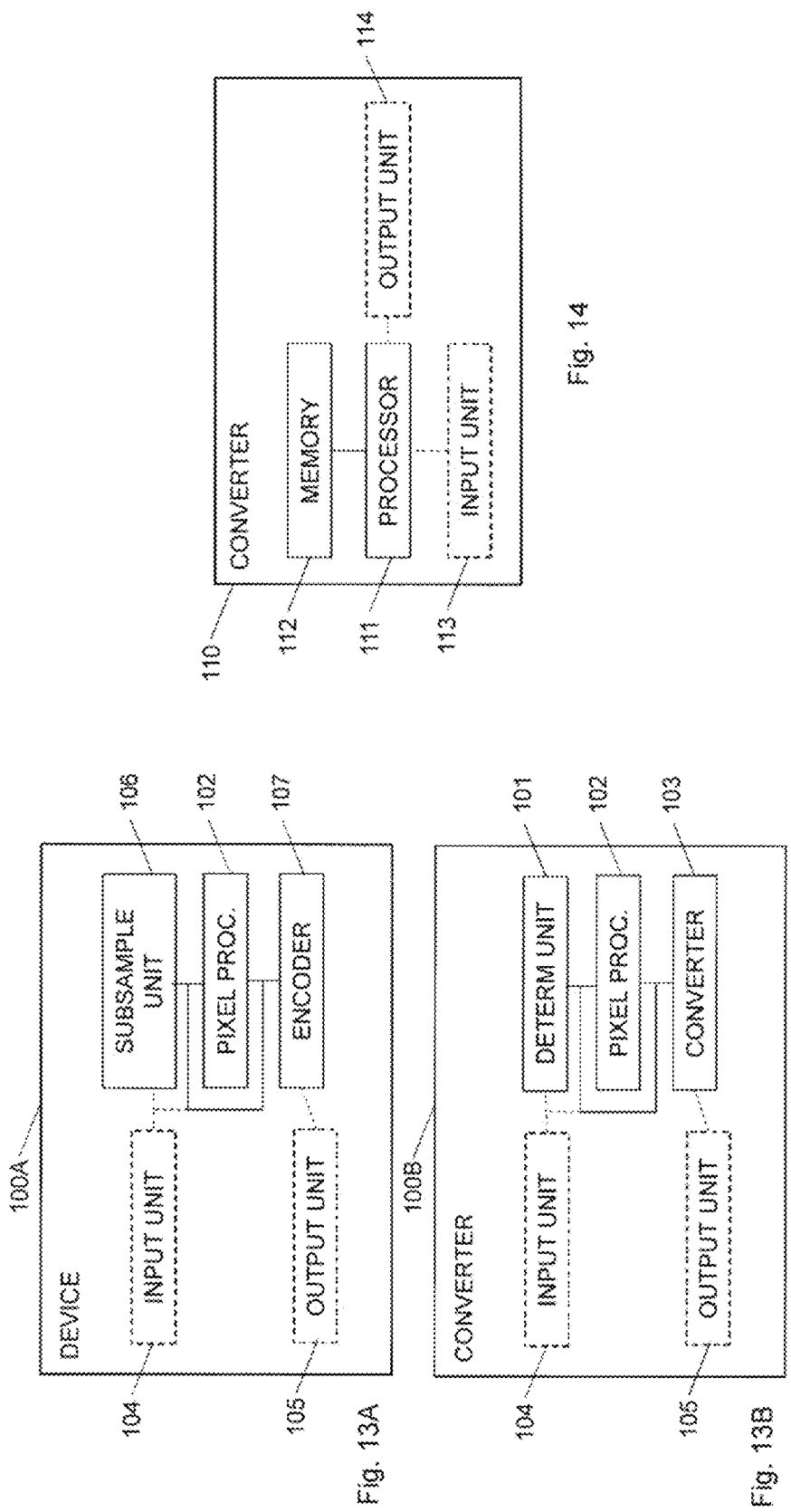

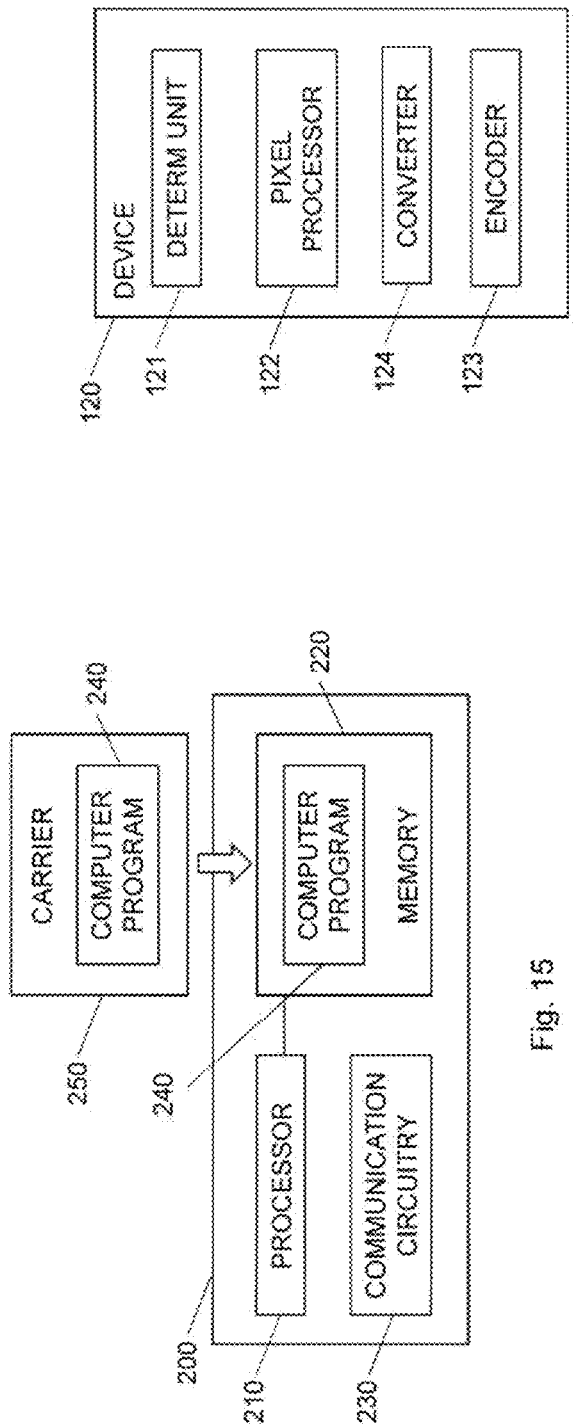

PIXEL PRE-PROCESSING AND ENCODING

TECHNICAL FIELD

The present embodiments generally relate to pre-processing and encoding of pixels in a picture, and in particular to such pre-processing and encoding that improves chrominance values of pixels.

BACKGROUND

A combination of a highly non-linear transfer function, 4:2:0 or 4:2:2 subsampling and non-constant luminance ordering gives rise to severe artifacts in saturated colors. An example is described in [1], where changes between two colors of similar luminance can result in a reconstructed image with very different luminances. In this document, the prior art way of processing the video is denoted the "anchor" way, since it was used to create the anchors in the MPEG call for evidence, described in [2].

The problem with using the anchor processing chain is that apart from getting inaccurate luminance, one may also get inaccurate chrominance. This is due to the fact that the chroma samples Cb' and Cr' are subsampled in the Y'Cb'Cr' space. There is a problem with this, namely that the non-linearity of the Y'Cb'Cr' color space will favor dark colors. This is not a desired outcome and implies that the chroma samples Cb' and Cr' will be inaccurate to start with.

The first part of subsampling is filtering, and since filtering is a kind of averaging, it is sufficient to see what happens when we average two colors. It is easier to see what happens when we average in the R'G'B' color space or domain than in Y'Cb'Cr', so first we will prove that averaging in these two domains amounts to the same thing. To do this, first note that Y'Cb'Cr' is just a linear combination of R'G'B', as illustrated for example with the BT.709 R'G'B' to Y'Cb'Cr' conversion matrix:

$$Y'=0.212600*R'+0.715200*G'+0.072200*B'$$

$$Cb'=-0.114572*R'-0.385428*G'+0.500000*B'$$

$$Cr'=0.500000*R'-0.454153*G'-0.045847*B' \quad \text{(equation 1)}$$

Thus, if the vector q holds the color in R'G'B'; q=(q1, q2, q3)=(R', G', B') and the vector p holds the same color in (Y', Cb', Cr'); p=(p1, p2, p3)=(Y', Cb', Cr'), we have p=M q, where M is the matrix above. Likewise q=$M^{-1}$ p. Assume we have two vectors in Y'Cb'Cr, $p_1$ and $p_2$ that we want to average. We will now show that first going to R'G'B', then performing the averaging, and then going back is the same as just averaging $p_1$ and $p_2$ directly. We go to R'G'B' by using $q_1 = M^{-1} p_1$, and $q_2 = M^{-1} p_2$.

The average in the R'G'B' space is $q_a = \frac{1}{2}(q_1+q_2)$, but this is equal to $q_a = \frac{1}{2}(q_1+q_2) = \frac{1}{2}(M^{-1} p_1 + M^{-1} p_2) = M^{-1} \frac{1}{2}(p_1+p_2)$.

Going back to Y'Cb'Cr' is done by multiplying with M, $p_a = M q_a = M M^{-1} \frac{1}{2}(p_1+p_2) = \frac{1}{2}(p_1+p_2)$, but this is the same thing as you would get if you averaged in Y'Cb'Cr' directly. We now only have to show that subsampling in R'G'B' favors dark colors.

Consider the two RGB colors (1000, 200, 0) and (10, 200, 0). The first color is very red, and the second color is very green. However, the first color is so much brighter than the second. If seen at a distance so that they blur into one, the net effect would be a reddish pixel since ½[(1000, 200, 0)+(10, 200, 0)]=(505, 200, 0), which is more red than it is green. However, in R'G'B', the two colors get the values (0.7518, 0.5791, 0) and (0.2997, 0.5791, 0). Their average will be ½[(0.7518, 0.5791, 0)+(0.2997, 0.5791, 0)]= (0.5258, 0.5791, 0), which when converted back to RGB is (119, 200, 0). Thus, the resulting color when averaged in the R'G'B' domain is almost twice as green as red. Thus, the dark color (10, 200, 0), which is green, has had an unduly big influence on the average.

To see how this can look in practice, consider a small image that is just 2×2 pixels, containing the following linear RGB colors:

| (3.41, 0.49, 0.12) | (0.05, 0.08, 0.02) |
| (0.05, 0.08, 0.02) | (0.05, 0.08, 0.02) |

Since this is a High Dynamic Range (HDR) image, it is hard to show it in a low-dynamic range medium such as this document. However it is possible to do several Low Dynamic Range (LDR) or Standard Dynamic Range (SDR) exposures by applying the function $$LDR\_red=clamp(0,255*(HDR\_red*2^c)^{gam},255),$$

where c goes from −3 to 1, gam=0.45 and clamp(a, t, b) makes sure the value t is between [a, b].

This can be called LDR-"exposures" of the HDR image.

The HDR pixel is quite dark—the highest coefficient is 3.41 out of 4000, so the darkest exposure is the most relevant here. The top left pixel is reddish and the surrounding pixels look black. Only in the brighter exposures is it possible to see that the dark pixels are actually a bit greenish.

However, when following the anchor processing chain to convert from RGB to Y'Cb'Cr' 4:2:0 and back again, the resulting HDR image will be

| (1.14, 0.79, 0.38) | (0.12, 0.06, 0.01) |
| (0.12, 0.06, 0.01) | (0.12, 0.06, 0.01) |

The problem here is that the redness of the top left pixel has disappeared and has been replaced with a gray/white pixel. The reason is that averaging in the non-linear Y'Cb'Cr' domain favors dark colors, which will make the resulting pixel unduly green. Furthermore, since there are three green pixels and just one red pixel, the result will be yet greener. The result is not very similar to the original.

There is, thus, a need for improvements with regard to inaccuracies in chrominance when using the prior art processing chain that is based on a combination of a highly non-linear transfer function, chroma subsampling and non-constant luminance ordering.

SUMMARY

It is a general objective to provide a pre-processing of pixels to combat visual artifacts.

These and other objectives are met by embodiments as disclosed herein.

An aspect of the embodiments relates to a method of pre-processing a pixel in a picture. The method comprises subsampling a linear color in a first color space to obtain a subsampled linear color in the first color space. The method also comprises applying a first transfer function to the subsampled linear color in the first color space to obtain a subsampled non-linear color in the first color space. The method further comprises applying a first color transform to the subsampled non-linear color in the first color space to obtain at least one of a subsampled first non-linear chroma component value in a second color space and a subsampled second non-linear chroma component value in the second color space. The method additionally comprises deriving a non-linear luma component value in the second color space for the pixel. A color of the pixel is then represented by the non-linear luma component value, the subsampled first non-linear chroma component value and the sub sampled second non-linear chroma component value in the second color space.

Another aspect of the embodiments relates to a device for pre-processing a pixel in a picture. The device is configured to subsample a linear color in a first color space to obtain a subsampled linear color in the first color space. The device is also configured to apply a first transfer function to the subsampled linear color in the first color space to obtain a subsampled non-linear color in the first color space. The device is further configured to apply a first color transform to the subsampled non-linear color in the first color space to obtain at least one of a subsampled first non-linear chroma component value in a second color space and a subsampled second non-linear chroma component value in the second color space. The device is additionally configured to derive a non-linear luma component value in the second color space for the pixel. A color of the pixel is represented by the non-linear luma component value, the subsampled first non-linear chroma component value and the subsampled second non-linear chroma component value in the second color space.

A further aspect relates to a device for pre-processing a pixel in a picture. The device comprises a determining unit for subsampling a linear color in a first color space to obtain a subsampled linear color in the first color space. The device also comprises a pixel processor for applying a first transfer function to the subsampled linear color in the first color space to obtain a subsampled non-linear color in the first color space and for applying a first color transform to the subsampled non-linear color in the first color space to obtain at least one of a subsampled first non-linear chroma component value in a second color space and a subsampled second non-linear chroma component value in the second color space. The device further comprises a converter for deriving a non-linear luma component value in the second color space for the pixel. A color of the pixel is represented by the non-linear luma component value, the subsampled first non-linear chroma component value and the sub-sampled second non-linear chroma component value in the second color space.

Yet another aspect of the embodiments relates to a device for encoding a pixel in a picture. The device comprises a processor and a memory comprising instructions executable by the processor. The processor is operative to subsample a linear color in a first color space to obtain a subsampled linear color in the first color space. The processor is also operative to apply a first transfer function to the subsampled linear color in the first color space to obtain a subsampled non-linear color in the first color space. The processor is further operative to apply a first color transform to the subsampled non-linear color in the first color space to obtain a subsampled first non-linear chroma component value in a second color space and a subsampled second non-linear chroma component value in the second color space. The processor is additionally operative to derive a non-linear luma component value in the second color space for the pixel based on the subsampled first non-linear chroma component value in the second color space, the subsampled second non-linear chroma component in the second color space and an original linear luminance component value in a third color space. The processor is also operative to encode the non-linear luma component value, the subsampled first non-linear chroma component value and the subsampled second non-linear chroma component value.

Yet another aspect of the embodiments relates to a device for encoding a pixel in a picture. The device comprises a determining unit for subsampling a linear color in a first color space to obtain a subsampled linear color in the first color space. The device also comprises a pixel processor for applying a first transfer function to the subsampled linear color in the first color space to obtain a subsampled non-linear color in the first color space and applying a first color transform to the subsampled non-linear color in the first color space to obtain a subsampled first non-linear chroma component value in a second color space and a subsampled second non-linear chroma component value in the second color space. The device further comprises a converter for deriving a non-linear luma component value in the second color space for the pixel based on the subsampled first non-linear chroma component value in the second color space, the subsampled second non-linear chroma component value in the second color space and an original linear luminance component value in a third color space. The device additionally comprises an encoder for encoding the non-linear luma component value, the subsampled first non-linear chroma component value and the subsampled second non-linear chroma component value.

Yet another aspect of the embodiments relates to a computer program comprising instructions, which when executed by a processor, cause the processor to subsample a linear color in a first color space to obtain a subsampled linear color in the first color space. The processor is also caused to apply a first transfer function to the subsampled linear color in the first color space to obtain a subsampled non-linear color in the first color space. The processor is further caused to apply a first color transform to the subsampled non-linear color in the first color space to obtain a subsampled first non-linear chroma component value in a second color space and a subsampled second non-linear chroma component value in the second color space. The processor is additionally caused to derive a non-linear luma component value in the second color space for the pixel. A color of the pixel is represented by the non-linear luma component value, the subsampled first non-linear chroma component value and the subsampled second non-linear chroma component value in the second color space.

A related aspect defines a carrier comprising the computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a signal representing an encoded version of a pixel in a picture. The encoded version comprises an encoded version of a subsampled first non-linear chroma component value in a second color format, an encoded version of a subsampled second non-linear chroma component value in the second color space and an encoded version of a non-linear luma component value in the second color format derived according to above.

The present embodiments provide a pixel pre-processing and encoding that combats artifacts that otherwise may occur due to usage of a non-linear transfer function in combination with chroma subsampling. Subjectively, the quality improvement in chrominance is clearly visible even for uncompressed video.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of pre-processing a pixel according to an embodiment;

FIG. 2 is a flow chart illustrating additional, optional steps of the method shown in FIG. 1 according to an embodiment;

FIG. 3 is a flow chart illustrating additional, optional steps of the method shown in FIG. 2 according to an embodiment;

FIG. 4 is a flow chart illustrating an embodiment of implementing the deriving step in FIG. 2;

FIG. 5 is a flow chart illustrating another embodiment of implementing the deriving step in FIG. 2;

FIG. 6 is a flow chart illustrating an additional, optional step of the method shown in FIG. 1 according to an embodiment;

FIG. 8 is a flow chart illustrating an additional step of the method shown in FIG. 1 to form a method of encoding a pixel according to an embodiment;

FIGS. 13A and 13B are schematic illustrations of hardware implementations of a device and a converter according to the embodiments;

FIG. 14 is a schematic illustration of an implementation of a device according to the embodiments with a processor and a memory;

FIG. 15 is a schematic illustration of a user equipment according to an embodiment;

FIG. 16 is a schematic illustration of an implementation of a device according to the embodiments with function modules;

DETAILED DESCRIPTION

Figure 7:
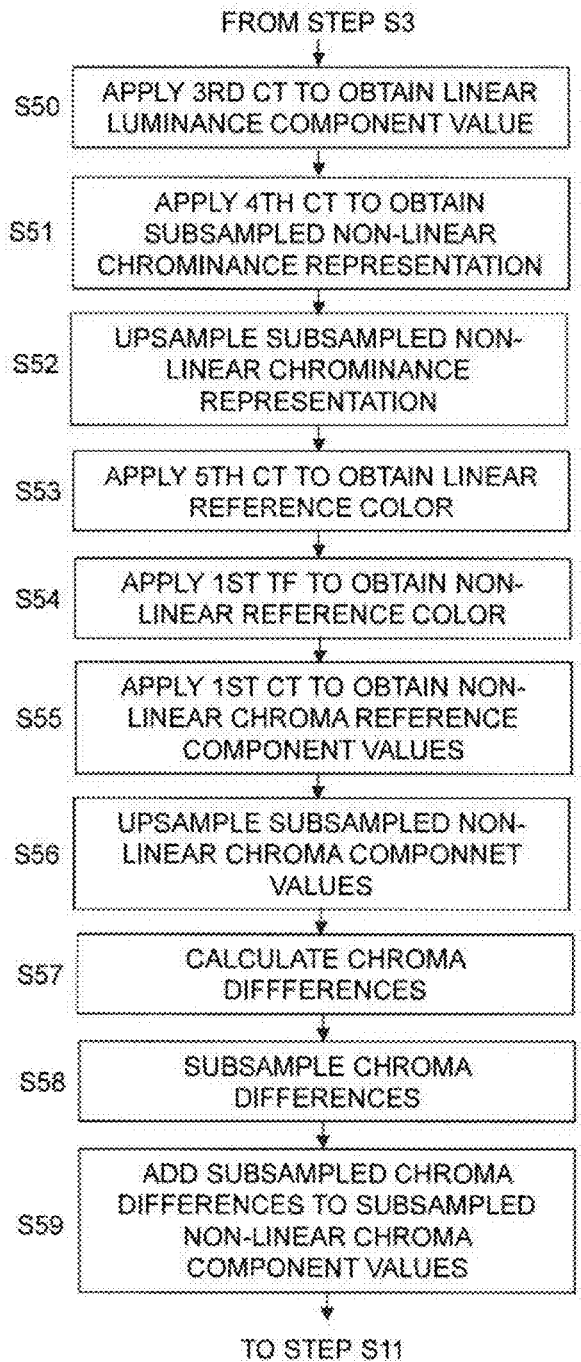
FIG. 7 is a flow chart illustrating additional, optional steps of the method shown in FIG. 1 according to an embodiment.

Throughout the drawings, the same reference numbers are used for similar or corresponding elements.

The present embodiments generally relate to pre-processing and encoding of pixels in a picture, and in particular to such pre-processing and encoding that improves chrominance values of pixels.

A traditional compression chain involves feeding pixels of incoming linear RGB light, typically ranging from 0 to 10,000 $cd/m^2$, to an inverse transfer function, which results in new pixel values between 0 and 1. After this, the pixels undergo color transform resulting in a luma component (Y') and two chroma components (Cb', Cr'). Then the two chroma components are subsampled, such as to 4:2:0 or 4:2:2. After decompression, the 4:2:0 or 4:2:2 sequences are upsampled to 4:4:4, inverse color transformed and finally a transfer function gives back pixels of linear light that can be output on a monitor.

A combination of a highly non-linear transfer function, chroma subsampling and non-constant luminance ordering gives rise to severe artifacts to the video data, in particular for saturated colors.

The pre-processing of pixels according to the embodiments can be used to combat or at least reduce the impact of artifacts, thereby resulting in a color that is closer to the incoming "true" color of a pixel.

A color space or color domain is the type and number of colors that originate from the combinations of color components of a color model. A color model is an abstract configuration describing the way colors can be represented as tuples of numbers, i.e. color components. The color components have several distinguishing features such as the component type, e.g. hue, and its unit, e.g. degrees or percentage, or the type of scale, e.g. linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (YCbCr, sometimes denoted Y'CbCr, Y'Cb'Cr', $YC_BC_R$, $Y'C_BC_R$ or $Y'C_B'C_R'$) color space and the luminance and chrominances (XYZ) color space.

In this document, the following terminology will be used.

RGB: Linear RGB values, where each value is proportional to the $cd/m^2$ ("number of photons").

XYZ: Linear XYZ values, where each value is a linear combination of RGB. Y is called "luminance" and loosely speaking reflects well what the eye perceives as "brightness".

pq(Y): A non-linear representation where the non-linear function pq(Y) has been applied to the linear luminance Y. pq(Y) is not to be confused with Y'. Since pq(.) resembles Barten's curve, a small step in pq(Y) is equivalent to a small step in perceived luminance.

R'G'B': Non-linear RGB values. R'=pq(R), G'=pq(G), B'=pq(B), pq(.) being a non-linear function. An example of a non-linear function is the Perceptual Quantizer (PQ) transfer function.

Y'Cb'Cr': A non-linear representation where each value is a linear combination of R', G' and B'. Y' is called "luma", and Cb' and Cr' are collectively called "chroma". This is to distinguish Y' from luminance, since Y' also contains some chrominance, and Cb' and Cr' also contain some luminance.

ICtCp: A representation of color designed for HDR and Wide Color Gamut (WCG) imagery and is intended as an alternative to Y'Cb'Cr'. I represents intensity and is a representation of luma information, whereas CtCp carries chroma information.

xy: A non-linear representation of chrominance, since it has been normalized for "brightness" through x=X/(X+Y+Z), y=Y/(X+Y+Z). A monochromatic laser will always have the same coordinates in xy no matter what intensity it has. This means that xy is a good measure of chrominance.

u'v': A non-linear representation of chrominance, that is a non-linear function of xy. It is supposed to be more perceptually uniform, meaning that a small step in u'v' will be equally perceptible regardless of which chrominance we are at. Just as for xy, a monochromatic laser will always have the same u'v' coordinates no matter what intensity it has.

pq(Y)xy: A representation of color where pq(Y) contains all the luminance and xy all the chrominance. From pq(Y) it is possible to extract Y, and from Y, x, and y it is possible to extract XYZ which can be transformed to RGB.

FIG. 1 is a flow chart illustrating a method of pre-processing a pixel in a picture. The method comprises subsampling, in step S1, a linear color in a first color space to obtain a subsampled linear color in the first color space. A next step S2 comprises applying a first transfer function (TF) to the subsampled linear color in the first color space to obtain a subsampled non-linear color in the first color space. The method continues to step S3, which comprises applying a first color transform (CT) to the subsampled non-linear color in the first color space to obtain at least one of a subsampled first non-linear chroma component value in a second color space and a subsampled second non-linear chroma component value in the second color space. The method further comprises deriving, in step S4, a non-linear luma component value in the second color space for the pixel. The a color of the pixel is represented by the non-linear luma component value, the subsampled first non-linear chroma component value and the subsampled second non-linear chroma component value in the second color space.

The pre-processing of FIG. 1 is applied to at least one pixel in the picture, such as a picture of a video sequence comprising multiple pictures, including a HDR or WCG video sequence. In an embodiment, the pre-processing can be applied to multiple, i.e. at least two, pixels in the picture, such as all pixels in the picture, which is schematically illustrated by the line L1 in FIG. 1.

The pre-processing as shown in FIG. 1 thereby results in at least one subsampled non-linear chroma component value in the second color space starting from a linear color in a first color space. In clear contrast to the prior art pre-processing, the present embodiment involves subsampling of a linear color, i.e. is performed in a linear color domain. The generation of a non-linear color then takes place following the subsampling, i.e. the first transfer function is applied to a subsampled linear color.

The prior art technology instead first applies a transfer function to a linear color to obtain a non-linear color. A color transform is then applied to the non-linear color followed by subsampling.

In an embodiment, the first color space is an RGB color space and the linear color is thereby an RGB color, denoted $R_O G_O B_O$ herein. The initial color is in unsubsampled or original format, i.e. 4:4:4 format. This $R_O G_O B_O$ 4:4:4 color is then preferably subsampled in step S1 to get a subsampled RGB color, i.e. RGB 2:2:2 color. Step S2 comprises applying a first transfer function to the RGB 2:2:2 color to obtain a subsampled non-linear color R'G'B' 2:2:2. The "'" is used to indicate that the red, green and blue color components are non-linear color components. In an embodiment, the first transfer function is the inverse of the transfer function in equation A1 shown in Annex A. Also other transfer functions traditionally employed to convert linear color values into non-linear color values could be used. The resulting subsampled non-linear color R'G'B' 2:2:2 is then color transformed from the R'G'B' color space to the second color space using a first color transform. This second color space is preferably the Y'Cb'Cr' color space and the first color transform could be the color transform specified in equation 1 and as defined in ITU-R BT.709, which is primarily used for High Definition Television (HDTV). Another color transform that could be used is shown in equation 2 below and as defined in ITU-R BT.601, which is primarily used for Standard Definition Television (SDTV).

$Y'=0.299000R'+0.587000G'+0.114000B'$ $Cb'=-0.168736R'-0.331264G'+0.500000B'$ $Cr'=0.500000R'-0.418688G'-0.081312B'$ (equation 2)

Equation 2 is generally used when considering RGB in BT.709. The corresponding equation when RGB originates from BT.2020 is presented below:

$Y'=0.262700R'+0.678000G'+0.059300B'$ $Cb'=-0.139630R'-0.360370G'+0.500000B'$ $Cr'=0.500000R'-0.459786G'-0.040214B'$ (equation 3)

The first color transform results in a Y'Cb'Cr' 2:2:2 color. In an embodiment, the subsampled non-linear luma component value Y', the subsampled first non-linear chroma component value Cb' and the subsampled second non-linear chroma component value Cr', all in the YCbCr color space, are obtained in step S3. In an alternative embodiment, only the subsampled non-linear chroma component values Cb', Cr' are calculated in step S3 thereby basically omitting the first line relating to the luma component Y in equations 1 to 3 above. In such an approach, step S3 comprises applying the first color transform to the subsampled non-linear color in the first color space to obtain the subsampled first non-linear chroma component value in the second color space and the subsampled second non-linear chroma component value in the second color space. Further embodiments include only calculating one of the non-linear chroma component values, i.e. Cb' or Cr'. In such embodiment, only the calculation in the second line or the third line in the color transform in equations 1 to 3 is performed in step S3.

The result of the pre-processing in step S3 is at least one subsampled non-linear chroma component value in the second color space, such as the Cb' value, the Cr' value or the Cb' value and the Cr' value.

The embodiments thereby propose a novel way of arriving at the subsampled chroma value or samples Cb' and Cr' when processing a pixel of a picture, such as of a video sequence.

The prior art pre-processing, denoted anchor chain herein, uses the following process to derive the Cb' and Cr' values:
RGB 4:4:4→(first transfer function)→R'G'B' 4:4:4→(first color transform)→Y'Cb'Cr' 4:4:4→(subsampling of Cb' and Cr')→Y'Cb'Cr' 4:2:0
where the subsampling from full resolution for all color components, 4:4:4, to subsampling of the chroma components in both the vertical and horizontal directions, 4:2:0, is done in the last step of the pre-processing chain.

According to an embodiment, the following pre-processing chain is proposed:
RGB 4:4:4→(subsampling of RGB)→RGB 2:2:2→(first transfer function)→R'G'B' 2:2:2→(first color transform)→Y'Cb'Cr' 2:2:2
where the subsampling instead is the first part of the pre-processing chain and is performed in the linear domain. Here we have used the term 2:2:2 to indicate that all three samples are at half resolution in both the vertical and horizontal directions, i.e. x- and y-dimension. In this way, we do not get a full-resolution non-linear luma Y' component, since the Y' component in the last step is in 2:2:2 format, i.e. half resolution in both directions.

In an embodiment, step S1 comprises subsampling the linear color in the first color space in both vertical and horizontal direction to obtain the subsampled linear color in the first color space. Such an approach results in, with a full resolution non-linear luma component in the second color format, a Y'Cb'Cr' color in the 4:2:0 format. In another embodiment, step S1 comprises subsampling the linear color in the first color space in only one direction, such as the horizontal direction or the vertical direction, to obtain the subsampled linear color in the first color space. This embodiment instead results in, with the full resolution non-linear luma component in the second color format, a Y'Cb'Cr color in the 4:2:2 format.

Subsampling in step S1 can be performed according to known subsampling techniques. For instance, a filtering operation or a nearest neighbor operation can be used. An example of subsampling technique that can be used according to the embodiments is disclosed in section B.1.5.5 Chroma downsampling from 4:4:4 to 4:2:0 in document [1].

The full resolution non-linear luma component value Y' can be derived according to various embodiments in step S4 in FIG. 1. In a first embodiment, the non-linear luma component value Y' is derived by the additional steps of applying the first transfer function to the linear color in the first color space to obtain a non-linear color in the first color space. The first color transform is then applied to the non-linear color in the first color space to obtain a non-linear luma component value in the second color space.

This embodiment thereby involves the steps:
RGB 4:4:4→(first transfer function)→R'G'B' 4:4:4→(first color transform)→Y'Cb'Cr' 4:4:4

The first color transform could be applied to calculate not only the non-linear luma component value Y' but also the non-linear chroma component values Cb', Cr', all in the 4:4:4 format. However, only the non-linear luma component value Y' is needed since the subsampled non-linear chroma component values Cb', Cr' are obtained according to the method steps S1 to S3 in FIG. 1. This corresponds to only performing the calculation, i.e. the first line in equations 1-3:

$Y'=0.212600R'+0.715200G'+0.072200B'$ or $Y'=0.299000R'+0.587000G'+0.114000B'$ or $Y'=0.262700R'+0.678000G'+0.059300B'$

The (full-resolution) non-linear luma component value Y' obtained, in this embodiment, according to above can then be combined with the subsampled non-linear chroma component values Cb', Cr' according to steps S1 to S3 to get the representation Y'Cb'Cr' in 4:2:0 or 4:2:2 format, which is a representation of the color of the pixel.

In an embodiment, the pre-processing method as shown in FIG. 1 is used to derive one of the subsampled non-linear chroma component values Cb', Cr'. In such a case, the other of the two subsampled non-linear chroma component values could be obtained from the prior art anchor processing.

In another embodiment, the full resolution non-linear luma component value Y' is derived according to a method denoted Ajusty herein and which is described further below and in Annex A.

Briefly, the Ajusty method comprises deriving, see step S11 in FIG. 2, a non-linear luma component value in the second color space for the pixel based on the subsampled first non-linear chroma component value in the second color space, the subsampled second non-linear chroma component value in the second color space and an original linear luminance component value in a third color space.

In an embodiment, the third color space mentioned above is the XYZ color space. Accordingly, the linear luminance of the pixel in the third color space is, in this embodiment, a Y component.

In an embodiment, the method comprises an additional step S10 as shown in FIG. 2. This step S10 comprises determining the original linear luminance component value of the pixel in the third color space based on the linear color of the pixel in the first color space.

Deriving the non-linear luma component value, thus, involves determination of an original linear luminance component value of the pixel in the third color space based on the linear color of the pixel in the first color space. This original linear luminance component value preferably reflects the true luminance of the pixel, i.e. the original luminance of the pixel prior to any subsampling, application of transfer function and color transformation. This original linear luminance component value is determined based on the linear color of the pixel in the first color space. In an embodiment, this linear color of the pixel in the first color space is the original incoming color of the pixel. In a particular embodiment, this original incoming color is the previously mentioned $R_OG_OB_O$ and the original linear luminance component is denoted $Y_O$.

The original linear luminance is, thus, the target luminance which could be calculated in many different ways. This original linear luminance does not necessarily have to correspond directly to the actual luminance of the sensor in the camera taking a picture or recording a video or in the panel of the display.

The original linear luminance component value in the third color space could be obtained to the pre-processing and encoding functionality as an original linear luminance component value, preferably $Y_O$ value, in a pre-determined or pre-calculated form. This means that the determination of the original linear luminance component value based on the linear color in the first color space has already taken place and only the result of the determination is provided to the pre-processing and encoding functionality.

In an alternative embodiment, the pre-processing of the embodiments comprises determination or calculation of the original linear luminance component value in step S10 using a third color transform, preferably an RGB-to-XYZ color transform, such as the color transform in equation 4 when RGB originates from BT.2020 or equation 5 when RGB originates from BT.709:

$X=0.636958R+0.144617G+0.168881B$ $Y=0.262700R+0.677998G+0.059302B$ $Z=0.000000R+0.028073G+1.060985B$ (equation 4)

$X=0.412391R+0.357584G+0.180481B$ $Y=0.212639R+0.715169G+0.072192B$ $Z=0.019331R+0.119195G+0.950532B$ (equation 5)

In fact, only the second line in equation 4 or 5 need to be calculated to obtain the original linear luminance value ($Y_O$) from the linear color in the first color space ($R_OG_OB_O$);

$Y_O=0.262700R_O+0.677998G_O+0.059302B_O$ or
$Y_O=0.212639R_O+0.715169G_O+0.072192B_O$.

The non-linear luma component value in the second color space is then derived for the pixel in step S11 based on the subsampled first and second non-linear chroma component values in the second color space and the original linear luminance component value in the third color space. Hence, in an embodiment, the non-linear luma component Y' in the YCbCr color space is a function of the Cb' and Cr' components in the YCbCr color space and the $Y_O$ component in the XYZ color space, i.e. $Y'=f(Cb', Cr', Y_O)$. The $Y_O$ component is in turn determined based on the $R_O G_O B_O$ color of the pixel in the RGB color space, i.e. $Y_O=g(R_O, G_O, B_O)$. Accordingly, $Y'=f(Cb', Cr', g(R_O, G_O, B_O))$.

The pre-processed pixel is then represented by the derived non-linear luma component (Y') and the two subsampled non-linear chroma components (Cb', Cr') in the second color space, i.e. Y'Cb'Cr'. Thus, the tuple Y'Cb'Cr' represents the pre-processed color of the pixel, preferably in the 4:2:0 or 4:2:2 format, i.e. with subsampled chroma components but non-subsampled luma component.

In an embodiment, step S11 of FIG. 2 comprises deriving a non-linear luma component value in the second color space that minimizes a difference between the original linear luminance component value in the third color space and a linear luminance component value in the third color space determined based on the non-linear luma component value in the second color space, the subsampled first non-linear chroma component value in the second color space and subsampled the second non-linear chroma component value in the second color space.

Hence, in this embodiment, step S11 involves finding the non-linear luma component value (Y') in the second color space (YCbCr) that minimizes the difference between the original linear luminance component value ($Y_O$) and the linear luminance component value (Y) in the third color space (XYZ). This linear luminance component value (Y) in the third color space (XYZ) is in turn obtained based on the non-linear luma component value (Y') and the two subsampled non-linear chroma component values (Cb', Cr') in the second color space (YCbCr).

Thus, this embodiment involves finding the Y' component value that minimizes the difference $|Y_O-Y|$ or $(Y_O-Y)^2$, wherein $Y=h(Y', Cb', Cr')$ and $h(.)$ defines that Y is determined based on Y', Cb' and Cr'.

In an alternative but related embodiment, step S11 involves deriving a non-linear luma component value in the second color space that minimizes a difference between a function of the original luminance component value in the third color space and a function of a linear luminance component value in the third color space. This linear luminance component value in the third color space is determined based on the non-linear luma component value in the second color space, the subsampled first non-linear chroma component value in the second color space and the subsampled second non-linear chroma component value in the second color space.

Thus, this embodiment involves finding the Y' component value that minimizes the difference $|k(Y_O)-k(Y)|$ or $(k(Y_O)-k(Y))^2$, wherein $Y=h(Y', Cb', Cr')$.

The function $k(.)$ is preferably an inverse transfer function, such as the inverse of the transfer function in equation A1 as shown in Annex A.

FIG. 3 is a flow chart illustrating additional, optional steps of the method shown in FIG. 2. These steps illustrate additional processing in order to derive an optimal non-linear luma component value for a pixel in a picture. The method continues from step S3 in FIG. 1. The method continues by upsampling the subsampled first non-linear chroma component value in the second color space and the subsampled second non-linear chroma component value in the second color space to get an upsampled first non-linear chroma component value in the second color space and an upsampled second non-linear chroma component value in the second color space in step S20. A next step S21 comprises applying a second color transform to a candidate non-linear luma component value in the second color space, the upsampled first non-linear chroma component value in the second color space and the upsampled second non-linear chroma component value in the second color space to get a non-linear color in the first color space. The next step S22 comprises applying a second transfer function to the non-linear color in the second color space to get a linear color in the first color space. Finally, a third color transform is applied in step S23 to the linear color in the first color space to get a linear luminance component value in the third color space. The method then continues to step S11 in FIG. 2, which comprises deriving the non-linear luma component value based on a comparison of the original linear luminance component value in the third color space and the linear luminance component value in the third color space.

Thus, in an embodiment, the subsampled Cb' and Cr' component values in 4:2:0 or 4:2:2 format are first upsampled to the 4:4:4 format. Upsampling in step S20 can be performed according to known upsampling techniques. For instance, upsampling could be performed by using bilinear or longer filters. An example of upsampling technique that can be used according to the embodiments is disclosed in section B.1.5.6 Chroma upsampling from 4:2:0 to 4:4:4 (Y'CbCr domain) in document [1].

These two upsampled Cb' and Cr' component values are then input together with a candidate Y' component value into a second color transform to get a non-linear R'G'B' color, such as the color transform:

$$R'=Y'+a13Cr'$$

$$G'=Y'-a22b'-a23Cr'$$

$$B'=Y'+a32Cb'$$

For Rec.709 color space a13=1.57480, a22=0.18732, a23=0.46812, a32=1.85560 and for BT.2020 color space a13=1.47460, a22=0.16455, a23=0.57135, a32=1.88140.

Generally, R', G' and B' can assume values within the interval [0, 1]. Accordingly, the second color transform may also include a clamping or clipping operation, such as R'=clip(Y'+a13Cr', 0, 1) for the R' component, wherein clip(x, a, b) is equal to a if x<a and equal to b if x>b and otherwise equal to x.

This R'G'B' color is then input into a second transfer function, such as the transfer function [1] in Annex A, to get a linear RGB color. This RGB color is then transformed from the RGB color space to the XYZ color space using the third color transform, such as the color transform in equation 4 or 5.

The linear luminance component Y value output form the third color transform is then compared to the original linear luminance component $Y_O$ value of the pixel in step S11.

In an embodiment, step S11 of FIG. 2 comprises selecting a candidate non-linear luma component value in the second color space that reduces a difference between the original linear luminance component value in the third color space and the linear luminance component value in the third color space.

Thus, step S11 preferably comprises selecting a candidate non-linear luma component value in the second color space that leads to at least a reduction in the difference between the original linear luminance component value and the linear luminance component value obtained in step S23. In a particular embodiment, step S11 comprises selecting a candidate non-linear luma component value in the second color space that minimizes the difference between the original luminance component value and the linear luminance component value in the third color space.

This difference could, as mentioned in the foregoing, be represented as $|Y_O-Y|$ or $(Y_O-Y)^2$, wherein Y is obtained in step S23 of FIG. 3.

In an alternative but related embodiment, step S11 involves selecting a candidate non-linear luma component value in the second color space that reduces or, preferably, minimizes a difference between a function of the original luminance component value in the third color space and a function of the linear luminance component value in the third color space, i.e. selecting the candidate Y' component value that minimizes the difference $|k(Y_O)-k(Y)|$ or $(k(Y_O)-k(Y))^2$.

In an embodiment, steps S21 to S23 in FIG. 3 are performed for different candidate non-linear luma component values in the second color space, which is schematically illustrated by the line L2. In such a case, step S11 preferably comprises selecting the candidate non-linear luma component value among the different candidate non-linear luma component values in the second color space that results in a smallest difference between the original linear luminance component value in the third color space and the linear luminance component value in the third color space or a smallest difference between a function of the original linear luminance component value in the third color space and a function of the linear luminance component value in the third color space.

This means that the loop of steps S21 to S23 are performed multiple times and using different candidate Y' component values in step S21. The candidate Y' component value that then lead to the smallest difference between $Y_O$ and Y or between $k(Y_O)$ and $k(Y)$ is selected and used together with the subsampled Cb' and Cr' component values as color representation of the pixel.

The following embodiments are described in more detail with regard to a difference between the original linear luminance component value ($Y_O$) in the third color space and the linear luminance component value (Y) in the third color space. These embodiments also encompass a difference between a function of the original linear luminance component value ($k(Y_O)$) in the third color space and a function of the linear luminance component value ($k(Y)$) in the third color space. The function is preferably, as previously mentioned herein, the inverse of a transfer function, such as an inverse of the transfer function in equation A1 in Annex A.

The selection of the optimal candidate Y' component value among multiple candidate Y' component values can be performed according to various embodiments as described further herein.

A first embodiment involves performing a binary search. Hence, in this embodiment the method comprises performing, see step S24 in FIG. 4, a binary search to select a candidate non-linear luma component value in the second color space that minimizes a difference between the original linear luminance component value in the third color space and the linear luminance component value in the third color space.

A binary search is an efficient technique that can be used to find the optimal candidate non-linear luma component value. Generally, a binary search algorithm begins by comparing the original luminance component value in the third color space to the linear luminance component value in the third color space obtained using the middle element of a sorted array of possible candidate non-linear luma component values in the second color space. If the linear luminance component value in the third color space is equal to the original luminance component value in the third color space or differs from the original luminance component value in the third color space with not more than a defined amount, then the position of the middle element is returned and the search is finished. If the linear luminance component value is greater than the original linear luminance component value, then the search continues on the lower half of the array; or if the linear luminance component value is less than the original linear luminance component value, then the search continues on the upper half of the array. This process continues, eliminating half of the elements, and comparing the resulting linear luminance component value to the original linear luminance component value, until the difference there between is zero or until the entire array has been searched, i.e. until all elements except one has been eliminated. This is guaranteed to only take $\log_2(N)$ steps, where N is the number of possible candidate non-linear luma component values in the array. For instance, assume that the candidate non-linear luma component values can be selected from the array of [0, 1023]. Then N=1024 and $\log_2(1024)=10$.

In an embodiment, the binary search is performed by performing steps S21 to S23 in FIG. 3 for a candidate non-linear luma component value in the second color space in the middle of a search interval. Thereafter, the candidate non-linear luma component value in the middle of the search interval is selected if the difference between the original luminance component value in the third color space and the linear luminance component value in the third color space is equal to zero. Otherwise, i.e. if the difference is not equal to zero, the method continues by selecting a search interval having half the size as compared to the search interval used above and ending at the candidate non-linear luma component value used above if the linear luminance component value in the third color space is larger than the original linear luminance component value in the third color space or selecting a search interval having half the size as compared to the search interval used above and starting at the candidate non-linear luma component value used above if the linear luminance component value in the third color space is smaller than the original linear luminance component value in the third color space.

The steps involving the loop L2 are then repeated until the difference between the original linear luminance component value in the third color space and the linear luminance component value in the third color space is equal to zero or at least smaller than a defined threshold value, the search interval cannot be halved any more, the loop has been repeated a defined number of times or the search interval has reached a predefined interval size, i.e. the search interval is smaller than or equal to the predefined interval size.

The selection of a search interval generally involves selecting a search interval having approximately half the size as compared to the search interval used above. For instance, if the search interval contains the values 100, 101, 102, 103 then one could choose either 101 or 102 as the "middle value", resulting in a "halved" search interval of [100, 101] (a true halving of the search interval) or [101, 103] (an approximate halving of the search interval) or a "halved" search interval of [100, 102] (an approximate halving of the search interval) or [102, 103] (a true halving of the search interval).

Another embodiment is to regard the selection of non-linear luma component value as an optimization problem and minimizes the error $E=(Y_O-Y)^2$ or $E=|Y_O-Y|$ with regard to Y'. This can be done, for instance, by gradient descent, by calculating the gradient of E with respect to Y', i.e. dE/dY', and update Y' a small amount in the opposite direction of the gradient, i.e. $Y'_{n+1}=Y'_n-\alpha(dE/dY')$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

A further embodiment involves using a look-up table (LUT) when selecting the non-linear luma component value. Such a LUT may, for instance, comprise the best Y' component value for every possible combination of Cb', Cr' and $Y_O$ component values. Assume, for instance, that the Cb' and Cr' components are quantized to 10 bits and that the $Y_O$ component is also quantized to 10 bits. Then the LUT should contain $2^{10} \times 2^{10} \times 2^{10}$ different Y' component values. This is equivalent to $2^{30}$ Y' component values. If each such Y' component value is two bytes, the LUT will have a size of $2^{31}$ bytes, or 2 Gb.

It may also be possible to use a smaller LUT. For instance, it may be possible to quantize the $Y_O$, Cb' and Cr' components to a smaller size, say 6 bits. Then the LUT would be $2^{18}$Y' component values, or $2^{19}$ bytes, which is equal to 512 kb.

The $Y_O$ component is linear. Accordingly, it may be inefficient to just quantize it. It may instead be better to use a function of $Y_O$ together with the Cb' and Cr' as input to the LUT to get the optimal Y' component. The function preferably outputs a non-linear representation of the $Y_O$ component and may, for instance, be an inverse transfer function (TF−1(.)), such as the inverse of the transfer function [1] in Annex A. The optimal Y' component value is then derived from the LUT as $Y'=LUT(Cb', Cr', TF^{-1}(Y_O))$.

FIG. 5 is a flow chart illustrating an embodiment of step S11 in FIG. 2 when using a LUT. The method continues from step S3 in FIG. 1. A next step S30 comprises upsampling the subsampled first non-linear chroma component value in the second color space and the subsampled second non-linear chroma component value in the second color space to get an upsampled first non-linear chroma component value in the second color space and an upsampled second non-linear chroma component value in the second color space.

The next step S31 comprises retrieving the non-linear luma component value in the second color space from a look-up table using the original linear luminance component value in the third color space, or a non-linear version thereof, the upsampled first non-linear chroma component value in the second color space and the upsampled second non-linear chroma component value in the second color space, or quantized versions thereof, as input to the look-up table.

In an embodiment, the method also comprises applying the first inverse transfer function to the original linear luminance component value in the third color space to get an original non-linear luminance component value in the third color space. The method then continues to step S31 in FIG. 5. In this embodiment, step S31 comprises retrieving the non-linear component value in the second color space from the look-up table using the original non-linear luminance component value in the third color space, the upsampled first non-linear chroma component value in the second color space and the upsampled second non-linear chroma component value in the second color space, or the quantized versions thereof, as input to the look-up table.

In an embodiment, the look-up table comprises, for each combination of the original linear luminance component value in the third color space, or the non-linear version thereof, the upsampled first non-linear chroma component value in the second color space and the upsampled second non-linear chroma component value in the second color space, or the quantized versions thereof, an optimal non-linear luma component value in the second color space that minimizes a difference between the original linear luminance component value in the third color space and a linear luminance component value in the third color space determined based on the optimal non-linear luma component value in the second color space, the subsampled first non-linear chroma component value in the second color space and the subsampled second non-linear chroma component value in the second color space.

The upsampling of the non-linear chroma component values in the second color space as performed in step S20 in FIG. 3 and step S30 in FIG. 5 preferably upsamples the non-linear chroma component values to a same number of samples as the non-linear luma component value in the second space.

The Ajusty method of deriving the non-linear luma component value Y' involves, in an embodiment, the following pre-processing steps:

RGB 4:4:4→(third color transform)→XYZ 4:4:4→Y 4:4:4+-----+---→Y'=Ajusty(Y 4:4:4, Cb'Cr' 4:4:4)
Y'Cb'Cr' 2:2:2→Cb'Cr'→2:2:2 (upsampling)→Cb'Cr' 4:4:4--/ where Y 4:4:4 is the luminance component of XYZ 4:4:4 and Cb'Cr' 4:4:4 are the upsampled chroma components of Y'Cb'Cr'. In short, the target luminance Y 4:4:4 is found by first converting RGB 4:4:4 to XYZ 4:4:4 and then using Y 4:4:4. We then get Cb'Cr' 4:4:4 by upsampling Y'Cb'Cr' 2:2:2 to 4:4:4 format and using Cb'Cr' 4:4:4. Finally, the Ajusty method described above and further shown in Annex A is used on Y 4:4:4 and Cb'Cr' 4:4:4 to find the best Y' 4:4:4.

Figure 10:
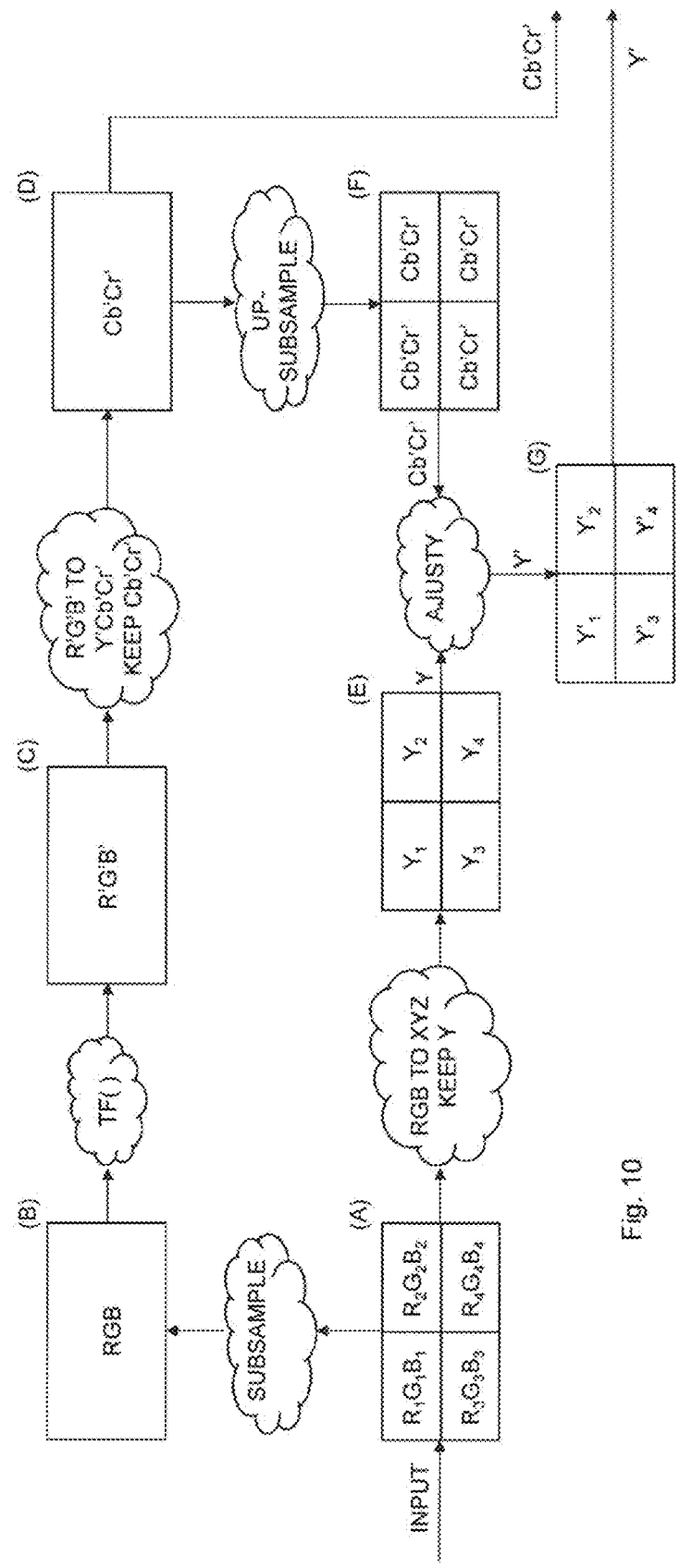
FIG. 10 illustrates an embodiment of obtaining Cb' and Cr' by subsampling in linear RGB and obtaining Y' by using Ajusty.

FIG. 10 illustrates an embodiment of obtaining Cb' and Cr' by subsampling in linear RGB and obtaining Y' by using Ajusty. The input to the pre-processing is an image or picture in linear RGB (4:4:4 format), such as a high resolution image or picture, i.e. HDR or WCG picture. In FIG. 10 and also in FIGS. 11 and 12, we have used an image or picture of 2×2 pixels or samples for illustration purposes, but a real image or picture is of course much bigger. The embodiments shown in FIGS. 10 to 12 can be used in combination or separately.

The first embodiment shown in FIG. 10 illustrates the pre-processing used in order to find good values for Y' and Cb'Cr'. The first step is to subsample the RGB image (A) to obtain a subsampled RGB image (B). In this example, subsampling is in both the x- and y-dimension. Next we create the first version of the Cb'Cr' coefficients by first applying the non-linear transfer function TF(.) to obtain R'G'B' (C) and then converting this to Y'Cb'Cr', keeping Cb'Cr' (D). Now we have Cb'Cr' in the correct, low, resolution, i.e. 2:2:2 format.

To also get Y' in the correct, high resolution, i.e. 4:4:4 format, we need the reference linear luminance Y for each pixel. We get that by converting the full resolution RGB input (A) to XYZ and keeping Y (E). We also upsample Cb'Cr' (F). We can now use Ajusty on Y (E) and Cb'Cr' (F) to get Y' (G). The output is now Cb'Cr (D) and Y' (G).

Please note that in the illustrative example with an image with 2×2 pixels, each pixel has its own derived non-linear luma component value in 4:4:4 format $Y_1$ to $Y_4$ but subsampled non-linear chroma component values in 2:2:2 format Cb'Cr' are derived for the 2×2 pixels due to subsampling in both the x- and y-dimension.

Once having arrived at a Y'Cb'Cr' 4:2:0 or 4:2:2 representation, it is possible to further improve it. The reason is that each Cb' and/or Cr' value, not being full resolution, will be used for several Y' values. However, due to the non-linear nature of the Y'Cb'Cr' space, changing the Y' component will affect not only the luminance of the pixel, but also the chrominance. Only one Y'-value will give the correct chrominance, namely the Y' from Y'Cb'Cr' 2:2:2, and if we deviate from this Y' value the chrominance will shift slightly. Some pixels will be larger than the Y' 2:2:2 value, and in those pixels the chrominance will be shifted in one way. Some other pixels will be smaller than the Y' 2:2:2 value, and their chrominances will be shifted the opposite way. Due to the non-linearities involved, these shifts may not cancel out. Therefore it may be advantageous to correct Cb' and/or Cr' in a way opposite to the way the aggregate chrominance has shifted.

FIG. 6 is a flow chart illustrating an additional step involving such a refinement. The method continues from step S3 in FIG. 1. A next step S40 comprises refining the at least one of the subsampled first non-linear chroma component value in the second color space and the subsampled second non-linear chroma component value in the second color space to counteract a replacement of a low-resolution non-linear luma component value in the second color space by a high-resolution non-linear luma component value for the pixel. The method then continues to step S4 in FIG. 1.

The refinement of the subsampled Cb' and/or Cr' values can be performed according to various embodiments, which are further described herein.

FIG. 7 is a flow chart illustrating an example of such a refinement. The method continues from step S3 in FIG. 1 to step S50. This step S50 comprises applying a third color transform to the linear color in the first color space to obtain a linear luminance component value in a third color space. A fourth color transform is applied to the subsampled linear color in the first color space to obtain a subsampled non-linear representation of chrominance in a fourth color space in step S51. The subsampled non-linear representation of chrominance in the fourth color space is upsampled in step S52 to obtain an upsampled non-linear representation of chrominance in the fourth color space. The following step S53 comprises applying a fifth color transform to the linear luminance component value in the third color space and the upsampled non-linear representation of chrominance in the fourth color space to obtain a linear reference color in the first color space. A next step S54 comprises applying the first transfer function to the linear reference color in the first color space to obtain a non-linear reference color in the first color space. The first color transform is applied in step S55 to the non-linear reference color in the first color space to obtain a first non-linear chroma reference component value in the second color space and a second non-linear chroma reference component value in the second color space. A next step S56 comprises upsampling the subsampled first non-linear chroma component value in the second color space and the subsampled second non-linear chroma component value in the second color space to obtain an upsampled first non-linear chroma component value in the second color space and an upsampled second non-linear chroma component value in the second color space. A first chroma difference is calculated between the first non-linear chroma reference component value in the second color space and the upsampled first non-linear chroma component value in the second space in step S57. Step S57 also comprises calculating a second chroma difference between the second non-linear chroma reference component value in the second color space and the upsampled second non-linear chroma component value in the second color space. The first chroma difference and the second chroma difference are then subsampled to obtain a subsampled first chroma difference and a subsampled second chroma difference. The subsampled first chroma difference is added to the subsampled first non-linear chroma component value in the second color space in step S59 to obtain an updated subsampled first non-linear chroma component value in the second color space. Correspondingly, the subsampled second chroma difference is added to the subsampled second non-linear chroma component value in the second color space to obtain an updated subsampled second non-linear chroma component value in the second color space.

In the above described refinement, both the Cb' and Cr' values have been refined according to steps S50 to S59. In an alternative embodiment, only the Cb' value or only the Cr' value is refined. In such a case, only one of the first and second non-linear chroma component values need to be used, such as in steps S55 to S59.

In an embodiment, the method continues to step S11 in FIG. 2. In this embodiment, step S11 comprises deriving a non-linear luma component value in the second color space for the pixel based on the subsampled updated first non-linear chroma component value in the second color space, the subsampled updated second non-linear chroma component value in the second color space and an original linear luminance component value in a third color space.

Hence, in this embodiment the updated Cb'Cr' values are input in the Ajusty method to thereby improve not only the non-linear chroma component values but also the non-linear luma component value.

Figure 11:
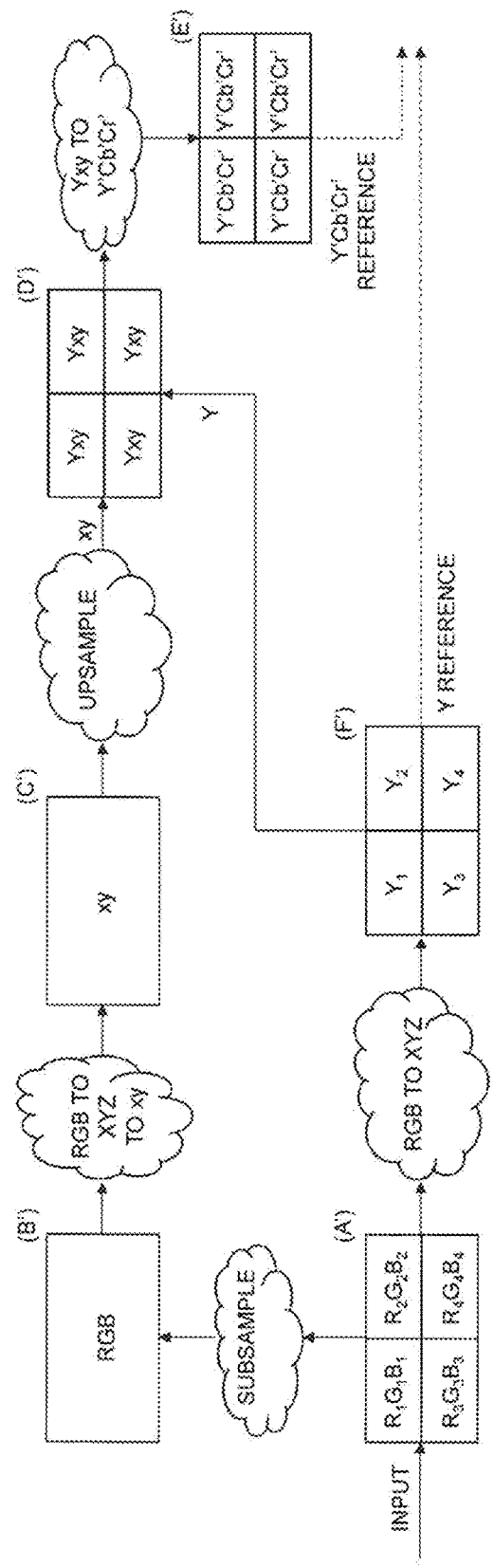
FIG. 11 illustrates an embodiment of creating references with chroma upsampling in a representation invariant to intensity.
Figure 12:
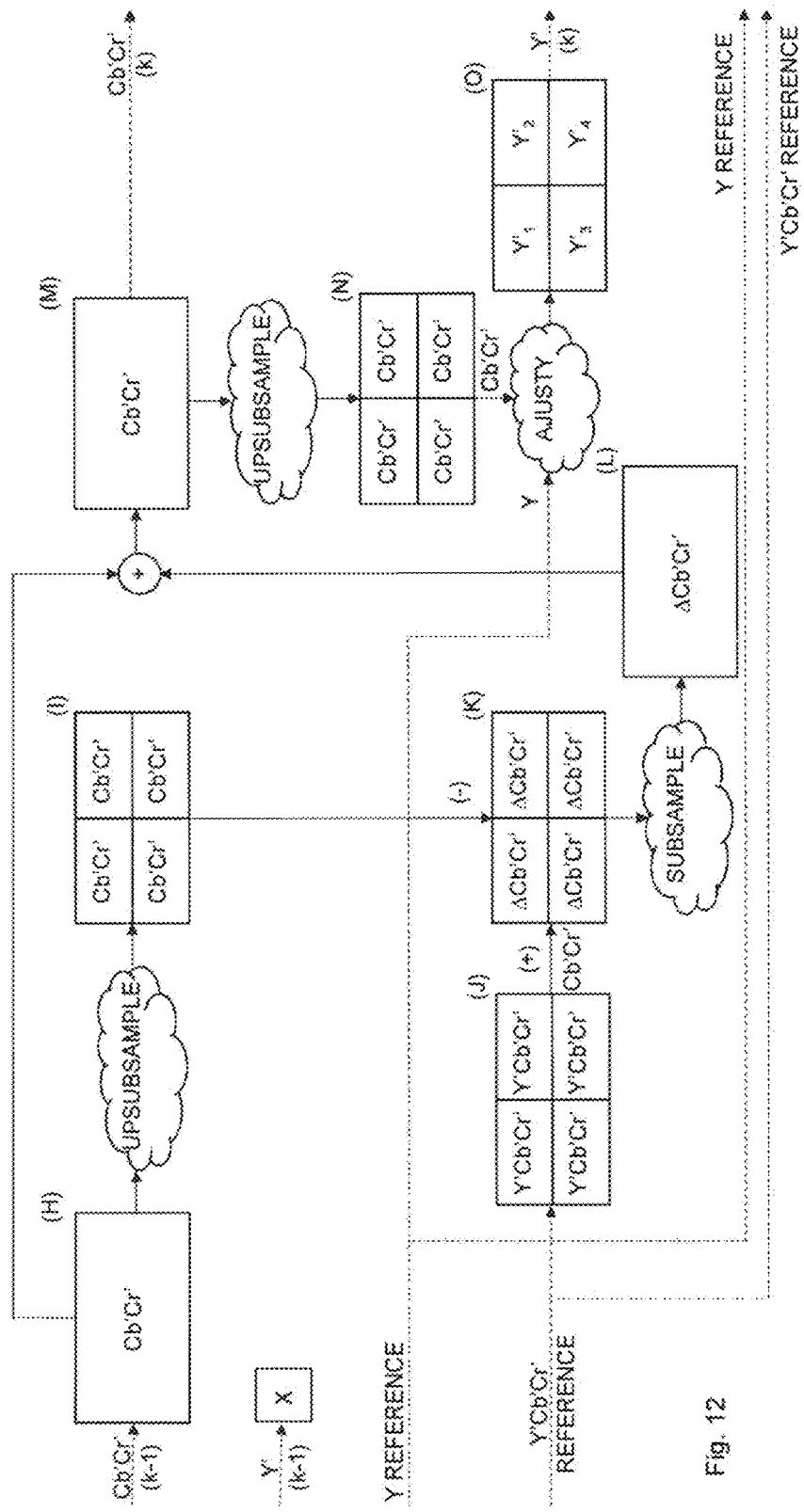
FIG. 12 illustrates an embodiment of iterative refinement of Cb' and Cr'.

This approach is further disclosed in FIGS. 11 and 12.

In this embodiment, the Cb'Cr' values from the first embodiment, see FIG. 10, are updated by the difference between the Cb'Cr' values derived from upsampling in a representation invariant to intensity and the upsampled Cb'Cr' values from the first embodiment. The updated Cb'Cr' values are then used together with the linear luminance Y to derive new Y' values using the Ajusty method.

FIG. 11 illustrates an embodiment of creating references with chroma upsampling in a representation invariant to intensity.

In order to improve the Cb'Cr' values we first need to create some references. We start with the linear RGB input (A'), which is the same as (A) in FIG. 10. The first reference is simply the full resolution linear luminance Y, which is obtained by converting RGB (A') to XYZ and throwing away XZ and keeping Y (F'). This is the same as (E) in FIG. 10. This gives the first reference, or Y reference.

We then subsample RGB 4:4:4 (A') to RGB 2:2:2 (B'), which is the same as (B) in FIG. 10. The next step is to convert from RGB (B') to XYZ and then to xyz, throwing away z and keeping xy (C'). The xy-values are then upsampled, and combined with Y (F') to form Yxy (D'). Each Yxy value (D') is then converted to Y'Cb'Cr', preferably by converting back to XYZ, then to RGB, then to R'G'B' and lastly to Y'Cb'Cr' (E'). This is the second reference or Y'Cb'Cr' reference.

FIG. 12 then illustrates an embodiment of iterative refinement of Cb' and Cr' using the references from FIG. 11.

We take the Cb'Cr' data (H). If we are in the first iteration, this is the same as (D) in FIG. 10. If we are in iteration k, this is the same as (M) for iteration k−1. We upsample (H) to get (I).

We get the Y'Cb'Cr' reference (J), which is the same as (E') in FIG. 11, and throw away the Y' keeping Cb' and Cr' for each pixel. Then Cb' and Cr' from (I) are subtracted, obtaining (K), which is a difference ΔCb'Cr' in each pixel. The difference signal in (K) is then subsampled (L), and then added to the Cb'Cr' signal in (H), resulting in an updated version of Cb'Cr' (M).

We now only need the Y' in the correct resolution. We do this by upsampling Cb'Cr' (M) to the higher resolution (N). The upsampled Cb'Cr' (N) together with the Y reference (F') from FIG. 11 is used by the Ajusty method to produce Y' (O). The output is now Cb'Cr' (M) and Y' (O).

It should be noted that when we say "convert RGB to XYZ and keep Y", it is often not necessary to convert all three components and then keeping only one. Typically in these cases it is possible to calculate only one the component that we want to keep. We have used this way of writing to emphasize that we mean Y from XYZ and not Y' from Y'Cb'Cr'.

In an embodiment, step S50 in FIG. 7 thereby comprises applying the third color transform to the RGB 4:4:4 colors to obtain the Y 4:4:4 component values in the XYZ color space. Step S51 comprises applying the fourth color transform to the RGB 2:2:2 color to go from RGB 2:2:2 to XYZ 2:2:2 and then to xyz 2:2:2, keeping xy 2:2:2 as the subsampled non-linear representation of chrominance in the xyz color space. The xy 2:2:2 representation is upsampled to get xy 4:4:4 in step S52. A fifth color transform is applied to the Y 4:4:4 component values from F' and the xy 4:4:4 from D' in step S53 to obtain a RGB 4:4:4 reference color via an Yxy-to-XYZ color transform and an XYZ-to-RGB color transform. Thus, the fifth color transform could be regarded as consisting of the-Yxy-to-XYZ and XYZ-to-RGB color transforms. The first transfer function is then applied to the RGB 4:4:4 reference color in step S54 to obtain the R'G'B' 4:4:4 reference color. The first color transform (RGB-to-YCbCr color transform) is then applied to the R'G'B' 4:4:4 reference color to get the Y'Cb'Cr' reference color 4:4:4 in step S55.

The subsampled Cb'Cr' 2:2:2 vales are upsampled into upsampled Cb'Cr' 4:4:4 values in step S56 and used together with the Cb'Cr' 4:4:4 reference values from step S55 to calculate the ΔCb'Cr' 4:4:4 difference in step S57. The ΔCb'Cr' 4:4:4 difference is subsampled into ΔCb'Cr' 2:2:2 and added to the subsampled Cb'Cr' 2:2:2 values to get the updated Cb'Cr' 2:2:2 values. These may then be upsampled and used together with the Y 4:4:4 reference as input to the Ajusty method.

In an alternative embodiment, the "find good values for Y' and Cb' Cr'" is replaced by the anchor processing chain: RGB 4:4:4→R'G'B' 4:4:4→Y'Cb'Cr' 4:4:4→(subsampling)→Y'Cb'Cr' 4:2:0. Then a new reference Y must be created each iteration by taking Y'Cb'Cr' 4:2:0→(up sample Cb' and Cr')→Y'Cb'Cr' 4:4:4→R'G'B' 4:4:4→RGB 4:4:4→XYZ 4:4:4→Y 4:4:4. This Y is then used in (D') in FIG. 11 instead of (F'). This will not create as good a luminance, but can be good under certain circumstances when you want to keep the anchor processing chain intact in the start, for instance for complexity reasons.

It should be clear that any target image or picture can be used. In the above we use a target image or picture that has a chrominance that is first subsampled in RGB and then converted to xy, together with a luminance Y that comes from the non-subsampled RGB converted to XYZ. However, it would be equally simple to use another target image or picture. As an example, one may want to first convert the image or picture from RGB to XYZ and then to xy, and then subsample this to get the subsampled xy. This could be combined with the same luminance Y. This particular embodiment would be good if you wanted to preserve the chrominance regardless of brightness. Also other target images could be used.

In another embodiment the subsampling in above embodiment consists of an adaptive filter which is optimized to reduce the error in a representation space in accordance with human vision.

In another embodiment one of or both of Cb' and Cr' are modified to get a better representation in the original representation or color space, or a representation space in accordance with human vision. The modification can be performed by iterative testing to modify a Cb' or Cr' value +1 or −1 and then upsample the modified value and unmodified values of Cb' and Cr', conversion to R'G'B', application of non-linear transfer function and converting to a representation or color space in accordance with human vision. If the modified Cb'/Cr' values give less absolute or squared error for a spatial region in a chroma specific color component representation space (not luminance) similar to Z for Cb' and X for Cr', the modification is selected. The spatial region is related to the size of the upsampling filter(s). If bilinear filters are used for the upsampling of 4:2:0 Cb' or Cr' refinements to 4:4:4 the size of the region is 3 horizontally and 4 vertically. If 4-taps filters are used for the upsampling the size of the region is 7 horizontally and 8 vertically. The error can also be weighted according to how a modified value can influence each of the 3×4 or 7×8 neighboring samples in 4:4:4 or just simply include the central part (3×2) of the region.

In another embodiment the magnitude of a Cb' or Cr' refinement is initialized to the magnitude of the average value of the Ajusty method in the central 3×2 region around the sample or pixel to be modified. The sign of the Cb' or Cr' refinement is derived by taking the sign from the average of the error before the refinement in a chroma specific color component representation space (not luminance) similar to Z for Cb' and X for Cr'. Thus, initial value of the Cb' refinement is Cb'+sign(error)*abs(average(Y' before Ajusty−Y' after Ajusty)/N), where N is about 2. If the modified Cb' gives less absolute or squared error for a spatial region in a chroma specific color component representation space (not luminance) similar to Z for Cb', the modification is selected. Similar applies if the method is applied for Cr'. In another embodiment the magnitude of a Cb' or Cr' refinement is initialized to the average value of Cb' or Cr' in 4:4:4 in the central 3×2 region around the sample to be modified. Thus, initial value of the Cb' refinement is average(Cb' in 4:4:4). If the modified Cb' gives less absolute or squared error for a spatial region in a chroma specific color component representation space (not luminance) similar to Z for Cb', the modification is selected. Similar applies if the method is applied for Cr'.

In another embodiment the adjustment of Y' to Ymod' by the Ajusty method is modified by one step towards Y' if that reduces the error in a chroma specific color component representation space similar to Z in XYZ (a metric other than luminance) while not causing any visual degradation in luminance Y. This can besides improving performance in a chroma specific color representation space also in some cases make it easier to encode Y'.

Embodiments described herein disclose the conversion from RGB 4:4:4 to Y'Cb'Cr' 4:2:0 where the chroma components are subsampled in both vertical and horizontal direction. The methods of the embodiments would of course work equally well when converting from RGB 4:4:4 to another subsampled Y'Cb'Cr format, e.g. Y'Cb'Cr' 4:2:2 where the chroma components have been subsampled in the horizontal direction only. Moreover, it would also be possible to subsample only one of the chroma components.

Figure 9:
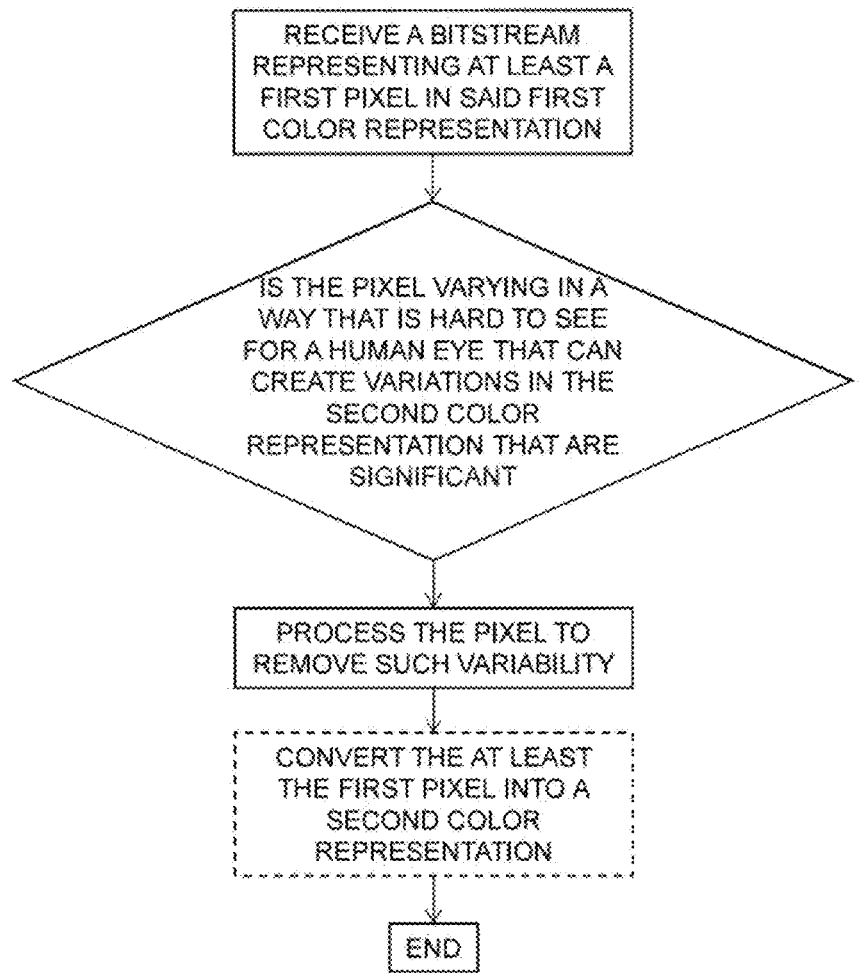
FIG. 9 illustrates a flow chart of a method according to one embodiment.

FIG. 9 illustrates a flow chart of a method according to one embodiment. The method comprises receiving a bitstream representing at least a first pixel in the first color representation or space. A next step investigates if the pixel is varying in a way that is hard to see for a human eye that can create variations in a second color representation or space that are significant. If the investigation concludes that such significant variations could be created, the pixel is processed to remove such variability. The method optionally comprises converting at least first pixel into the second color representation.

The pre-processing of pixels according to the embodiments can be used in different applications, in particular different video applications, including video encoding.

An embodiment therefore relates to a method of encoding a pixel in a picture. The method comprises pre-processing the pixel according to any of the embodiments as disclosed herein to derive a subsampled first non-linear chroma component value in a second color space, a subsampled second non-linear chroma component value in the second color space and a non-linear luma component value in the second color space. The method also comprises, in step S12 as shown in FIG. 8, encoding the non-linear luma component value, the subsampled first non-linear chroma component value and the subsampled second non-linear chroma component value.

Thus, the pre-processing of pixels can be used as an additional processing during encoding pixels of pictures, such as in connection with encoding pictures of a video sequence.

The output of the pre-processing, i.e. Y'Cb'Cr', such as in the 4:2:0 or 4:2:2 format, is then input to a video encoder, such as a H.264 video encoder, a High Efficiency Video Encoder (HEVC) or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g. a context-adaptive binary arithmetic coding (CABAC) encoder.

An advantage of the pre-processing of the embodiments is that it can be applied to any video or picture encoding process without the need for performing any adjustments in the video or picture encoder or any adjustments in the corresponding video or picture decoder. In clear contrast, the pre-processing can be seen as an additional processing, i.e. pre-processing, that is applied to the input pictures instead of the traditional conversion of original colors, such as $R_O G_O B_O$ colors, of pixels in pictures to be encoded into Y'Cb'Cr' colors that involves application of transfer function, application of color transform and chroma subsampling.

The pre-processing of pixels in pictures, such as of a video sequence, may also be used in other applications besides video encoding. For instance, the embodiments can be used as a pre-processing that is applied before transferring video over an interface, such as high-definition multimedia interface (HDMI), DisplayPort or Thunderbolt. For example, in HDMI 2.0a the only way to convey 4K resolution at 50 or 60 frames per second (fps) is to use 4:2:0 or 4:2:2 YCbCr subsampling. If the video data is in full chroma sampling format (4:4:4) then a subsampling pre-processing step must be applied before sending the video data over the HDMI cable. The 4:2:0 or 4:2:2 video data is then transferred over the interface without further compression. By applying the pre-processing of the embodiments, the video quality is improved compared to conventional 4:2:0 or 4:2:2 subsampling in the non-linear domain, i.e. subsampling of Cb'Cr' values.

In the foregoing, embodiments have been described with regard to subsampling a RGB 4:4:4 color into a RGB 2:2:2 color as a preferred example of a linear color, followed by applying of a transfer function to obtain a R'G'B' 2:2:2 color as a preferred example of a subsampled non-linear color. A color transform is then applied to obtain Cb' and/or Cr' value(s) and a Y value is derived as preferred examples of subsampled non-linear chroma component values and non-linear luma component value, respectively.

The embodiments are, however, not limited thereto. ICtCp is an alternative color space, in which the I value carries luma information and the CtCp values carry chroma information. In an embodiment, LMS values in the LMS color space can be obtained from RGB values and a color transform according to equation 6:

$$L=(1688*R+2146*G+262*B)/4096$$

$$M=(683*R+2951*G+462*B)/4096$$

$$S=(99*R+309*G+3688*B)/4096 \quad \text{(equation 6)}$$

A transfer function, such as the inverse of $\text{EOTF}_{PQ}$, can then be applied to the LMS values in order to obtain non-linear L'M'S' values. Finally, a color transform is applied to these L'M'S' value to obtain the ICtCp values:

$$I=0.5*L'+0.5*M'$$

$$Ct=(6610*L'-13613*M'+7003*S')/4096$$

$$Cp=(17933*L'-17390*M'-543*S')/4096 \quad \text{(equation 7)}$$

The embodiments can then be applied to this case according to below. In a first approach, a linear RGB 4:4:4 color of the pixel is subsampled to obtain a subsampled linear RGB 2:2:2 color in step S1 of FIG. 1. The method also comprises applying a color transform, such as according to equation 6 above, to the subsampled linear RGB 2:2:2 color to obtain a subsampled linear LMS 2:2:2 color. A transfer function, such as the inverse of $\text{EOTF}_{PQ}$, is applied to the linear LMS 2:2:2 color to obtain the non-linear L'M'S' 2:2:2 color in step S2. A color transform, such as equation 7 above, is applied to the non-linear L'M'S' 2:2:2 color in step S3 to obtain subsampled non-linear chroma component value(s) Ct and/or Cp. The non-linear luma component value I is then derived in step S4 similar to the previously described embodiments using Y' as non-linear luma component value.

In an alternative approach, the method of FIG. 1 starts by subsampling, in step S1, a linear LMS 4:4:4 color of the pixels into a linear LMS 2:2:2 color. Hence, in this embodiment, the linear color of the pixel in the first color space is a LMS 4:4:4 color in the LMS color space. The following steps S2-S4 are performed as mentioned above.

According to the embodiments, by subsampling in a linear space before converting to Y'Cb'Cr', we can get chroma samples that better reflect the true chrominance in a scene, compared to the anchor process. However, subsampling early in the chain means that we need to come up with a Y'-component some other way. This is solved, in an embodiment, by using the Ajusty method to use Y' to match a given luminance Y given Cb' and Cr'.

In another aspect, the Cb' and Cr' samples are further refined to counteract the shifting that happens when the low-resolution Y' component is replaced by a high resolution Y' component. This further improves the color fidelity.

In yet another aspect, the Y' samples after the Ajusty method are modified towards the Y' values before the Ajusty method if that reduces the error in another metric than the luminance without causing any visual degradation of the luminance.

According to a first aspect, a method for converting a pixel RGB representation in a first resolution to subsampled chroma samples Cb' and Cr' is provided. That is achieved by subsampling the RGB representation in both the x- and the y-dimension, and creating a first version of the Cb'Cr' samples by first applying a non-linear transfer function tf(.) to obtain R'G'B' and then to convert this to Y'Cb'Cr'.

Accordingly a device and a method thereof is provided where the device is configured to subsample the RGB representation of a pixel in a linear domain to get subsampled Cb'Cr' components, and the device is further configured to use the AJUSTY method to get the Y' component.

An optional step is to then correct the Cb'Cr' values to better fit the new Y'-values.

Another aspect of the embodiments relates to a device for pre-processing a pixel in a picture. The device is configured to subsample a linear color in a first color space to obtain a subsampled linear color in the first color space. The device is also configured to apply a first transfer function to the subsampled linear color in the first color space to obtain a subsampled non-linear color in the first color space. The device is further configured to apply a first color transform to the subsampled non-linear color in the first color space to obtain at least one of a subsampled first non-linear chroma component value in a second color space and a subsampled second non-linear chroma component value in the second color space. The device is additionally configured to derive a non-linear luma component value in the second color space for the pixel. A color of the pixel is represented by the non-linear luma component value, the subsampled first non-linear chroma component value and the subsampled second non-linear chroma component value in the second color space.

In an embodiment, the device is configured to derive the non-linear luma component value in the second color space for the pixel by applying the first transfer function to the linear color space in the first color space to obtain a non-linear color in the first color space and applying the first color transform to the non-linear color space in the first color space to obtain the non-linear luma component value.

In another embodiment, the device is configured to derive the non-linear luma component value in the second color space for the pixel based on the subsampled first non-linear chroma component value in the second color space, the subsampled second non-linear chroma component value in the second color space and an original linear luminance component value in a third color space.

In an embodiment, the device is configured to determine the original linear luminance component value of the pixel in the third color space based on the linear color of the pixel in the first color space.

In an embodiment, the device is configured to derive a non-linear luma component value in the second color space that minimizes a difference between the original linear luminance component value in the third color space and a linear luminance component value in the third color space determined based on the non-linear luma component value in the second color space, the subsampled first non-linear chroma component value in the second color space and the subsampled second non-linear chroma component value in the second color space.

In an embodiment, the device is configured to upsample the subsampled first non-linear chroma component value in the second color space and the subsampled second non-linear chroma component value in the second color space to obtain an upsampled first non-linear chroma component value in the second color space and an upsampled second non-linear chroma component value in the second color space. The device is also configured to apply a second color transform to a candidate non-linear luma component value in the second color space, the upsampled first non-linear chroma component value in the second color space and the upsampled second non-linear chroma component value in the second color space to obtain a non-linear color in the first color space. The device is further configured to apply a second transfer function to the non-linear color in the first color space to obtain a linear color in the first color space. The device is additionally configured to apply a third color transform to the linear color in the first color space to obtain a linear luminance component value in the third color space. The device is also configured to derive the non-linear luma component value based on a comparison of the original linear luminance component value in the third color space and the linear luminance component value in the third color space.

In an embodiment, the device is configured to select a candidate non-linear luma component value in the second color space that reduces a difference between the original linear luminance component value in the third color space and the linear luminance component value in the third color space.

In an embodiment, the device is configured to perform application of the second color transform to a candidate non-linear luma component value in the second color space, the upsampled first non-linear chroma component value in the second color space and the upsampled second non-linear chroma component value in the second color space, application of the second transfer function to the non-linear color in the first color space and application of the third color transform to the linear color in the first color space for different candidate non-linear luma component values in the second color space. In this embodiment, the device is also configured to select the candidate non-linear luma component value among the different candidate non-linear luma component values in the second color space that results in a smallest difference between the original linear luminance component value in the third color space and the linear luminance component value in the third color space.

In an embodiment, the device is configured to perform a binary search to select a candidate non-linear luma component value in the second color space that minimizes a difference between the original linear luminance component value in the third color space and the linear luminance component value in the third color space.

In an embodiment, the device is configured to upsample the subsampled first non-linear chroma component value in the second color space and the subsampled second non-linear chroma component value in the second color space to obtain an upsampled first non-linear chroma component value in the second color space and an upsampled second non-linear chroma component value in the second color space. The device is also configured to retrieve the non-linear luma component value in the second color space from a look-up table based on the original linear luminance component value in the third color space, or a non-linear version thereof, the upsampled first non-linear chroma component value in the second color space and the upsampled second non-linear chroma component value in the second color space, or quantized versions thereof.

In an embodiment, the device is configured to refine the at least one of the subsampled first non-linear chroma component value in the second color space and the subsampled second non-linear chroma component value in the second color space to counteract a replacement of a low-resolution non-linear luma component value in the second color space by a high-resolution non-linear luma component value for the pixel.

In an embodiment, the device is configured to apply a third color transform to the linear color in the first color space to obtain a linear luminance component value in a third color space. The device is also configured to apply a fourth color transform to the subsampled linear color in the first color space to obtain a subsampled non-linear representation of chrominance in a fourth color space. The device is further configured to upsample the subsampled non-linear representation of chrominance in the fourth color space to obtain an upsampled non-linear representation of chrominance in the fourth color space. The device is additionally configured to apply a fifth color transform to the linear luminance component value in the third color space and the upsampled non-linear representation of chrominance in the fourth color space to obtain a linear reference color in the first color space. The device is also configured to apply the first transfer function to the linear reference color in the first color space to obtain a non-linear reference color in the first color space. The device is further configured to apply the first color transform to the non-linear reference color in the first color space to obtain a first non-linear chroma reference component value in the second color space and a second non-linear reference chroma component value in the second color space. The device is additionally configured to upsample the subsampled first non-linear chroma component value in the second color space and the subsampled second non-linear chroma component value in the second color space to obtain an upsampled first non-linear chroma component value in the second color space and an upsampled second non-linear chroma component value in the second color space. The device is also configured to calculate a first chroma difference between the first non-linear chroma reference component value in the second color space and the upsampled first non-linear chroma component value in the second color space and a second chroma difference between the second non-linear chroma reference component value in the second color space and the upsampled second non-linear chroma component value in the second color space. The device is further configured to subsample the first chroma difference and the second chroma difference to obtain a subsampled first chroma difference and a subsampled second chroma difference. The device is additionally configured to add the subsampled first chroma difference to the subsampled first non-linear chroma component value in the second color space to obtain an updated subsampled first non-linear chroma component value in the second color space and the subsampled second chroma difference to the subsampled second non-linear chroma component value in the second color space to obtain an updated subsampled second non-linear chroma component value in the second color space.

In an embodiment, the device is configured to derive the non-linear luma component value in the second color space for the pixel based on the subsampled updated first non-linear chroma component value in the second color space, the subsampled updated second non-linear chroma component value in the second color space and an original linear luminance component value in a third color space.

FIGS. 13A and 13B illustrate particular hardware implementations of a device 100A and a converter 100B, respectively, according to the embodiments. In an embodiment, see FIG. 13A, the device 100A comprises a subsample unit 106 configured to subsample the RGB representation of a pixel in a linear domain to get subsampled Cb'Cr' components. The device 100A also comprises a pixel processor 102 configured to use the Ajusty method to get the Y' component.

In an embodiment, the device 100A also comprises an input unit 104 configured to receive the video to be encoded and an output unit 105 configured to output the Y'Cb'Cr' data.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 could be in the form of a general output unit, in particular in the case of a wired connection to external devices. Alternatively, the output unit 105 could be in the form of a transmitter or transceiver, in particular in the case or a wireless connection to external devices.

The input unit 104 is preferably connected to the subsample unit 106, which is connected to the pixel processor 102 which is connected to the output unit 105. The output unit may forward the Y'Cb'Cr' representation to the encoder. It should be noted that the device 100A also could be part of the encoder or could comprise an encoder 107.

In FIG. 13B, the converter 100B, illustrated as an implementation example of the device, comprises a determining unit 101 configured to subsample the RGB color 4:4:4 to a subsampled RGB color 2:2:2 and to apply the first transfer function to the subsampled RGB color 2:2:2 to get the subsampled non-linear R'G'B' color 2:2:2. The converter 100B also comprises a converter 103 configured to apply the first color transform to convert the R'G'B' color 2:2:2 into the subsampled non-linear chroma component values Cb'Cr' 2:2:2. The pixel processor 102 of the converter 100B is configured to use derive the non-linear luma component value Y' 4:4:4 based on the subsampled non-linear chroma component values using the Ajusty method. The converter 10B0 may optionally also comprise the previously mentioned input unit 104 and output unit 105.

In an embodiment, the device 100A or converter 100B comprises a determining unit 101 or subsample unit 106, a pixel processor 102 and a converter 103, and optionally the input unit 104 and output unit 105. In such a case, the determining unit 101 or subsample unit 106 is configured to subsample the linear color in the first color space to obtain a subsampled linear color in the first color space. The pixel processor 102 is configured to apply the first transfer function to the subsampled linear color in the first color space to obtain the subsampled non-linear color in the first color space. The converter 103 or pixel processor 102 is then configured to apply the first color transform to the subsampled non-linear color in the first color space to obtain at least one of the subsampled first non-linear chroma component value in the second color space and the subsampled second non-linear chroma component value in the second color space.

Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more FPGAs, or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the device 110, see FIG. 14, comprises a processor 111 and a memory 112 comprising instructions executable by the processor 111. The processor 111 is operative to subsample the RGB representation of a pixel in a linear domain to get subsampled Cb'Cr' components, and preferably to use the Ajusty method to get the Y' component.

In an embodiment, the device 110 also comprises an input unit 113 configured to receive the bitstream representing the pixel to be processed. In such a case, the processor 111 is operative to receive the bitstream from the input unit 113.

In an embodiment, the device 110 also comprises an output unit 114 configured to output the Y'Cb'Cr' bitstream as received from the processor 111.

In a particular embodiment, the processor 111 is operative, when executing the instructions stored in the memory 112 to perform the above described operations. The processor 111 is thereby interconnected to the memory 112 to enable normal software execution.

Thus, in an embodiment the device 110 for pre-processing a pixel in a picture, represented by a converter in FIG. 14, comprises a processor 111 and a memory 112 comprising instructions executable by the processor 111. The processor 111 is operative to subsample the linear color in the first color space. The processor is also operative to apply the first transfer function to the subsampled linear color in the first color space. The processor 111 is additionally operative to apply the first color transform to the subsampled non-linear color in the first color space. The processor 111 is further operative to derive the non-linear luma component value in the second color space.

FIG. 15 is a schematic block diagram illustrating an example of a user equipment or device 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of video data, including a pictures to be pre-processed.

The user equipment 200 can be any device or apparatus that can receive and process video data. For instance, the user equipment 200 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to subsample the RGB representation of a pixel in a linear domain to get subsampled Cb'Cr' components, and the user equipment 200 is further configured to use the Ajusty method to get the Y' component.

Thus, in an embodiment the computer program 240 comprises instructions, which when executed by a processor 210, cause the processor to subsample a linear color in a first color space to obtain a subsampled linear color in the first color space. The processor 210 is also caused to apply a first transfer function to the subsampled linear color in the first color space to obtain a subsampled non-linear color in the first color space. The processor 210 is further caused to apply a first color transform to the subsampled non-linear color in the first color space to obtain a subsampled first non-linear chroma component value in a second color space and a subsampled second non-linear chroma component value in the second color space. The processor 210 is additionally caused to derive a non-linear luma component value in the second color space for the pixel. A color of the pixel is represented by the non-linear luma component value, the subsampled first non-linear chroma component value and the subsampled second non-linear chroma component value in the second color space.

In an embodiment, the computer program further comprises instructions, which when executed by the processor 210, cause the processor 210 to encode the subsampled first non-linear chroma component value, the subsampled second non-linear chroma component value and the non-linear luma component value in the second color space, preferably derived for the pixel based on the subsampled first non-linear chroma component value in the second color space, the subsampled second non-linear chroma component value in the second color space and an original linear luminance component value in a third color space.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the device 200 in FIG. 15, for execution by the processor 210 thereof.

A further aspect of the embodiments also relates to a signal representing an encoded version of a pixel in a picture. The encoded version comprises an encoded version of a subsampled first non-linear chroma component value in a second color format, an encoded version of a subsampled second non-linear chroma component value in the second color space and an encoded version of a non-linear luma component value in the second color format derived according to any of the embodiments.

In an embodiment, the signal is one of an electronic signal, an optical signal, an electromagnetic signal, a magnetic signal, an electric signal, a radio signal and a microwave signal.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 16.

FIG. 16 is a schematic block diagram of an arrangement or device 120 with function modules. The arrangement 120 comprises a determining unit or subsample unit 121 for subsampling the RGB representation of a pixel in a linear domain to get subsampled Cb'Cr' components. The device 120 also comprises a pixel processor 122 for using the Ajusty method to get the Y' component.

The device 120 further comprises a video encoder 123 for encoding the bitstream representing Y'Cb'Cr'. The device 120 may also comprise a converter 124.

In an embodiment, the determining unit or subsampling unit 121 is for subsampling a linear color in a first color space to obtain a subsampled linear color in the first color space. The pixel processor 122 is for applying a first transfer function to the subsampled linear color in the first color space to obtain a subsampled non-linear color in the first color space. The converter 124 is for applying a first color transform to the subsampled non-linear color in the first color space to obtain at least one of a subsampled first non-linear chroma component in a second color space and a subsampled second non-linear chroma component value in the second color space. The optional encoder 123 is then for encoding the subsampled first and second non-linear chroma component values and a non-linear luma component value in the second color space.

A further aspect relates to a device 120 for pre-processing a pixel in a picture 120. The device 120 comprises a determining unit 121 for subsampling a linear color in a first color space to obtain a subsampled linear color in the first color space. The device 120 also comprises a pixel processor 122 for applying a first transfer function to the subsampled linear color in the first color space to obtain a subsampled non-linear color in the first color space and for applying a first color transform to the subsampled non-linear color in the first color space to obtain at least one of a subsampled first non-linear chroma component value in a second color space and a subsampled second non-linear chroma component value in the second color space. The device further comprises a converter 124 for deriving a non-linear luma component value in the second color space for the pixel. A color of the pixel is represented by the non-linear luma component value, the subsampled first non-linear chroma component value and the subsampled second non-linear chroma component value in the second color space Yet another aspect of the embodiments relates to a device 110 for encoding a pixel in a picture, see FIG. 14. The device 110 comprises a processor 111 and a memory 112 comprising instructions executable by the processor 111. The processor 111 is operative to subsample a linear color in a first color space to obtain a subsampled linear color in the first color space. The processor 111 is also operative to apply a first transfer function to the subsampled linear color in the first color space to obtain a subsampled non-linear color in the first color space. The processor 111 is further operative to apply a first color transform to the subsampled non-linear color in the first color space to obtain a subsampled first non-linear chroma component value in a second color space and a subsampled second non-linear chroma component value in the second color space. The processor 111 is additionally operative to derive a non-linear luma component value in the second color space for the pixel based on the subsampled first non-linear chroma component value in the second color space, the subsampled second non-linear chroma component in the second color space and an original linear luminance component value in a third color space. The processor 111 is also operative to encode the non-linear luma component value, the subsampled first non-linear chroma component value and the subsampled second non-linear chroma component value.

Yet another aspect of the embodiments relates to a device 120 for encoding a pixel in a picture, see FIG. 16. The device 120 comprises a determining unit 121 for subsampling a linear color in a first color space to obtain a subsampled linear color in the first color space. The device 120 also comprises a pixel processor 122 for applying a first transfer function to the subsampled linear color in the first color space to obtain a subsampled non-linear color in the first color space and applying a first color transform to the subsampled non-linear color in the first color space to obtain a subsampled first non-linear chroma component value in a second color space and a subsampled second non-linear chroma component value in the second color space. The device 120 further comprises a converter 124 for deriving a non-linear luma component value in the second color space for the pixel based on the subsampled first non-linear chroma component value in the second color space, the subsampled second non-linear chroma component value in the second color space and an original linear luminance component value in a third color space. The device 120 additionally comprises an encoder 123 for encoding the non-linear luma component value, the subsampled first non-linear chroma component value and the subsampled second non-linear chroma component value.

The present embodiments also relates to a user equipment comprising a device for pre-processing a pixel or a device for encoding a pixel according to the embodiments. The user equipment is preferably a device or apparatus configured to receive and process video data. The user equipment could, for instance, be a device or apparatus configured to forward video data over an interface, such as HDMI.

Another embodiment relates to a user equipment comprising a device for pre-processing a pixel or a device for encoding a pixel according to the embodiments. In this embodiment, the user equipment is preferably selected from a group consisting of a computer, a laptop, a smart phone, a tablet and a set-top box.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 17:
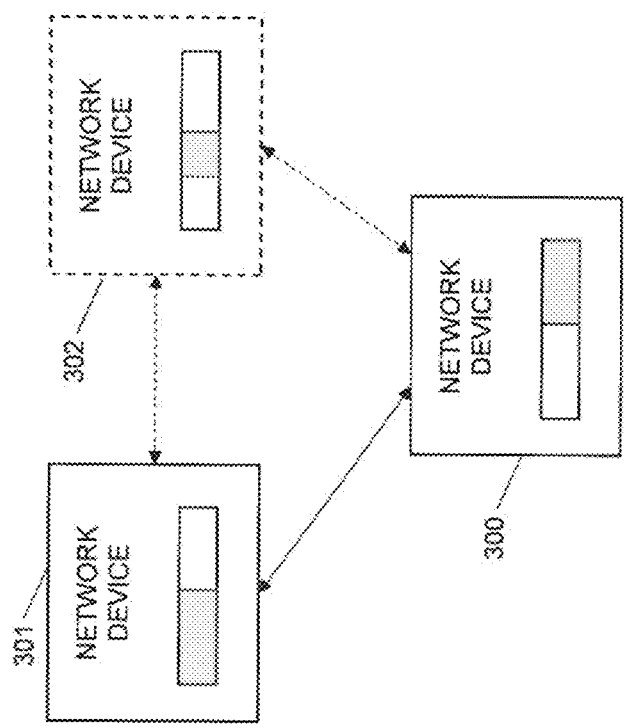
FIG. 17 schematically illustrate a distributed implementation of the embodiments among multiple network devices.

FIG. 17 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 18:
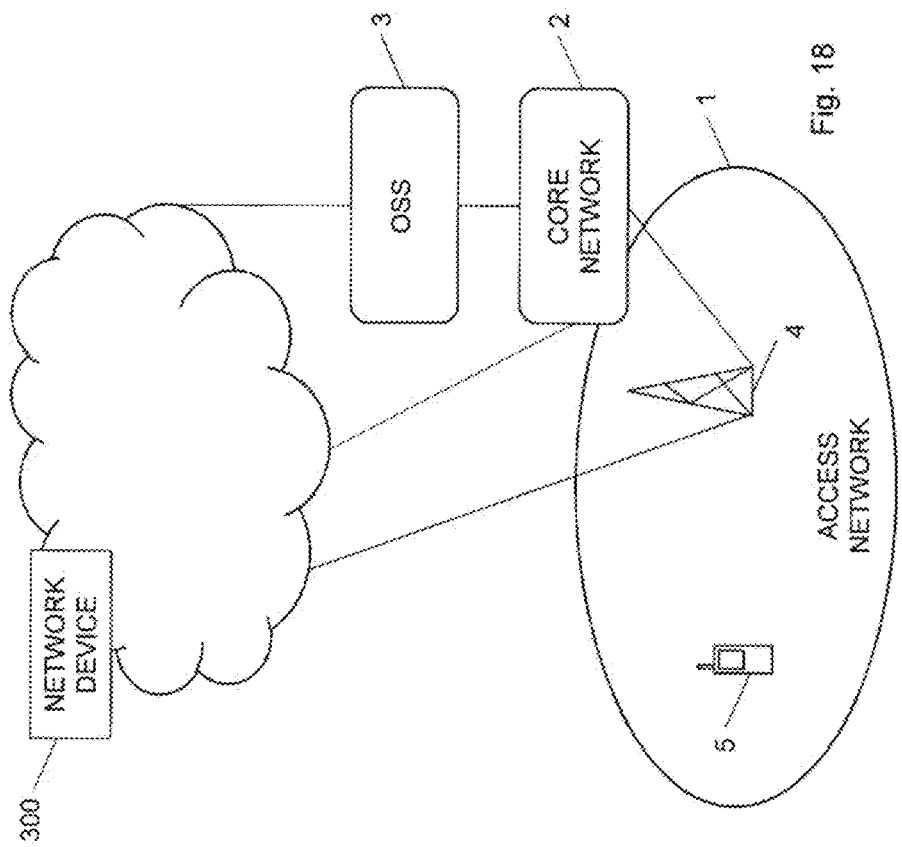
FIG. 18 is a schematic illustration of an example of a wireless communication system with one or more cloud-based network devices according to an embodiment.

FIG. 18 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

Annex A

The present Annex A comprises a description of the Ajusty method that can be used according to the embodiments in order to derive a non-linear luma component value in the second color space.

A combination of a highly non-linear transfer function, 4:2:0 or 4:2:2 subsampling and non-constant luminance ordering gives rise to severe artifacts in saturated colors. An example is described in Annex B, where changes between two colors of similar luminance can result in a reconstructed image with very different luminances.

In a digital video signal, each component of a sample, i.e. pixel, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma γ is the exponent value. This is typically 2.4 (but can also be other values): $Y=V^\gamma$.

Using a gamma function works well for low luminance signals but when the luminance goes above 100 nits (cd/m²) the gamma function is not well aligned with the contrast sensitivity of the human visual system. Therefore transfer functions that are more non-linear are defined, e.g.:

$$Y = L_p\left(\frac{\max[(V^{1/m} - c_1), 0]}{c_2 - c_3 V^{1/m}}\right)^{1/n} \quad \text{(equation A1)}$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \ \frac{cd}{m^2}$$

This transfer function is more non-linear than the gamma function in the sense that the maximum value of its first derivative over the range from 0 to 1 is larger than that of the gamma function.

Chroma subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e. colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e. apply the transfer function after conversion to the CIE1931 XYZ color space. However, such a solution is not aligned with common practice within the broadcasting industry and might in some scenarios be difficult and expensive to realize.

A typical compression chain is described below. The incoming linear light pixel (R, G, B) ranging from 0 to 10,000 is first fed to the transfer function, which results in a new pixel (R', G', B') between 0 and 1. After this, the pixel undergoes color transform resulting in Y'Cb'Cr'. Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y' Cb' Cr') generated from the interpolated colors is not so different from the original. Ideally the difference would be so small that it is not noticeable.

Basically it emanates to realizing that the Cb' and Cr' components are false, and then make also the Y' component false so that the (Y' Cb' Cr') are closer to the true colors. In other words, by introducing an error in Y' we can compensate for the errors already existing in Cb' and Cr' to come closer to the real pixel. It could be determined that the Cb' and Cr' components are false by comparing Cb'–Cb and Cr-Cr with a threshold by e.g. comparing the Cb' that you get from first subsampling chroma (4:2:0) then upsampling (to 4:4:4).

According to a first aspect an Ajusty method is provided. The method can be performed in an encoder or in a pre-process to the encoder. In the method, when it is determined that the Cb' and/or Cr' components include errors, a corrected Y' component is derived to compensate for the errors in the Cb' and/or the Cr' components.

According to a second aspect a unit, such as a pre-processor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The corrected Y' component can derived according to different embodiments as described below. Hence the corrected Y' component, Cb' and Cr' are then compressed resulting in that the image or video is perceived with a higher quality.

By changing the Y' component, i.e. deriving a corrected Y' component, we can compensate the resulting luminance value. The eye is much more sensitive to luminance changes than to chrominance changes, so the first rule must always be to make sure that the luminance does not deviate too much from the original value.

As described above, the non-linear luminance Y' is adjusted prior to compression so that the linear luminance Y of the pixel is closer to its correct value. This is further described below.

Assume a picture where the left part of the screen, e.g. pixels 0 to 96, has the value (2142, 0, 138) and that the right part, e.g. pixels 97 to 1920, has the value (2142, 4, 138). With a conventional processing chain we would get the results in Table A1.

TABLE A1

Data for the "worst" color for 4:2:0 subsampling

| Pixel no. 97 | RGB value | Y value | Y diff | relative error | Barten steps |
|---|---|---|---|---|---|
| original | 2142 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 3993.733 2.4265 263.6030 | 1066.4311 | 492.8320 | 85.9192% | 195.2710 |

*This inidcates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation 4)}$$

This Y component is the luminance that the eye is most sensitive to. It should not be confused with the Y' component mentioned above, which depends nonlinearly on R, G and B.

As can be seen in Table A1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable.

If we look at Table A2, we can see what happens.

TABLE A2

Pixel 97 is very different before and after color subsampling

| | 94 | 95 | 96 | 97 | 98 | 99 |
|---|---|---|---|---|---|---|
| 4:4:4 10 bits Linear RGB in | 2142 0 138 | 2142 0 138 | 2142 0 138 | 2142 4 138 | 2142 4 138 | 2142 4 138 |
| Y'Cb'Cr' 4:2:0 10 bits | 284 650 867 | 284 | 284 641 855 | 422 | 422 575 771 | 422 |
| Y'Cb'Cr' after unsampling | 284 650 867 | 284 650 866 | 284 641 855 | 422 607 812 | 422 575 771 | 422 571 766 |
| Linear RGB out | 2151.71 0 138.2278 | 2119.42 0 138.2278 | 1794.94 0.0018 114.8210 | 3993.73 2.4265 263.6030 | 2142.66 3.9750 138.2966 | 1986.71 4.2102 127.3837 |

If we look at the Cb' component, it has the value 607, which is about halfway between 650, before the discontinuity, i.e. pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table A3 we show the result.

TABLE A3

Pixel 97 is much more similar before and after color subsampling

| 4:4:4 10 bits | 94 | 95 | 96 | 97 | 98 | 99 |
|---|---|---|---|---|---|---|
| Linear RGB in | 2142 0 138 | 2142 0 138 | 2142 0 138 | 2142 4 138 | 2142 4 138 | 2142 4 138 |
| Y'Cb'Cr' 4:2:0 10 bits | 284 650 867 | | 284 641 855 | 363 | 422 575 771 | 422 |
| Y'Cb'Cr' after unsampling | 284 650 867 | 284 650 866 | 284 641 855 | 363 607 812 | 422 575 771 | 422 571 766 |
| Linear RGB out | 2151.71 0 138.2278 | 2119.42 0 138.2278 | 1794.94 0.0018 114.8210 | 2145.11 0.7008 138.0825 | 2142.66 3.9750 138.2966 | 1986.71 4.2102 127.3837 |

We can now see that the new color is much more similar to its correct value. The green component has gone in the wrong direction, but only by 1.72 cd/m$^2$, but at the same time the red component has almost halved to its correct value, a movement of 1849 cd/m$^2$, and the blue component has changed in a similar fashion. In Table A4 we show what happens to the luminance.

TABLE A4

Data for the "worst" color for 4:2:0 subsampling after correction

| Pixel no. 97 | RGB value | Y value | Y diff | relative error | Barten steps |
|---|---|---|---|---|---|
| original | 212 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 2145.11 0.7008 138.0825 | 572.1852 | 1.4139 | 0.2465% | 0.5602 |

*This indicates values obtained by upsampling the subsampled color in 4:2:0 format As is seen in Table A4, we get a much smaller error in the luminance Y. The relative error is 0.2465%, which is equivalent to 0.5602 Barten steps, i.e. not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m$^2$ instead of 3.9750 cd/m$^2$ but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e. largest error, is minimized.

Another variant is to use two or more neighboring values of Cb' and Cr' and use them directly to calculate the range of possible Cb' and Cr' values.

Figure 19:
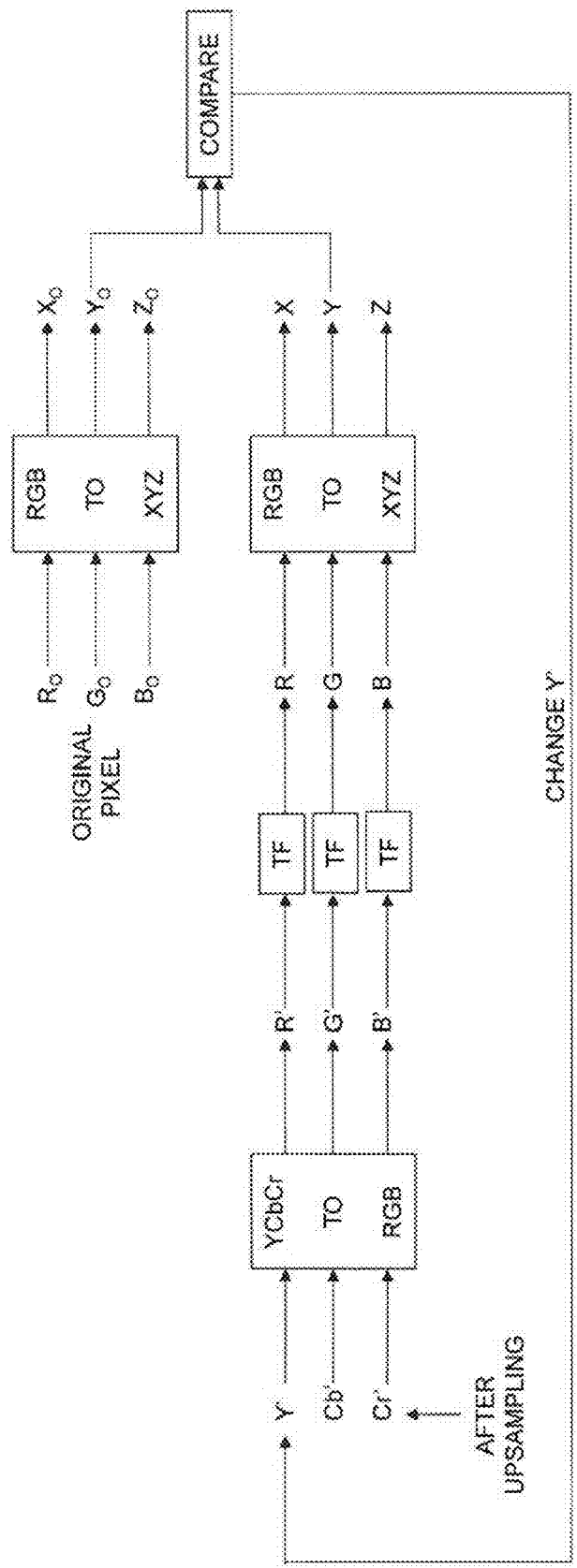
FIG. 19 illustrates an embodiment of deriving the corrected Y'.

There are several ways to find the best value for Y', we will go through a number of them. One way is shown in FIG. 19.

First we need to find the value $Y_O$ to optimize towards. The original pixel $R_O$, $G_O$, $B_O$ is transformed from RGB to XYZ as mentioned above. This results in $X_O$, $Y_O$, $Z_O$, of which we are only interested in $Y_O$. In fact, we do not need to calculate $X_O$ and $Z_O$. This $Y_O$ is the original luminance in linear light, and it is this that the eye is sensitive to. In our test case $Y_O$ is equal to 573.5991, see Table A1.

Second, we take our existing Y' value, together with the Cb' and Cr' values. In the case above, we would feed in (422, 607, 812), see Table 2. Now we would do a color transform from Y'Cb'Cr' to R'G'B'. This is done using $R' = Y' + 1.47460 \times Cr'$ $G' = Y' - 0.16455 \times Cb' - 0.57135 \times Cr'$ $B' = Y' + 1.88140 \times Cb'$. (equation A2)

Next we invoke the transfer function. In this case we use the PQ-EOTF, which can be implemented using the following Matlab code, for instance:

function L=pq_eotf(c)
%%%
%%% c goes from 0.0 to 1.0%

%%% L is output luminance in nits
%%%
c1=0.8359375;
c2=18.8515625;
c3=18.6875;
n=0.1593017578125;
m=78.84375;
c=max(c,0);
c=min(c,1);
L=10000*((max(c.^(1/m)−c1, 0)./(c2−c3*c.^(1/m))).^(1/n));

The result is the color (R, G, B) in linear light. Now we convert this to XYZ as mentioned above, or really, we only need to calculate Y. This Y is the linear luminance of the pixel, and it is this luminance that we want to make as close as possible to $Y_O$. In our test case, Y starts out being 1066.4311, see Table A1.

Now we compare Y and $Y_O$. If Y is bigger than $Y_O$, we reduce our Y' value from 422 to something smaller. For instance, we can take one step and try 421. Then the entire calculation is carried out again, generating a new Y value. This is again compared to $Y_O$, and if it is still too big, we reduce Y' further. Finally, we will reach 363 and the resulting Y value, i.e. 572.1852 is now smaller than $Y_O$, i.e. 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_O$, we should search in the interval [0, 512]. If the Y-value is smaller than $Y_O$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024)=10$ steps are sufficient.

Yet another way to calculate the best value is to see FIG. 8 as an optimization problem and minimize the error $E=(Y-Y_O)^2$ with respect to Y'. This can be done by gradient descent, by calculating the gradient of E with respect to Y', i.e. dE/dY', and update Y' a small amount in the opposite direction of the gradient: $Y'_{n+1}=Y'_n-\alpha \times dE/dY'$, where α is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y':
  X, $Y_O$ and Z are converted with a XYZ to RGB conversion to produce new values R1, G1 and B1
  R1, G1 and B1 are converted with an inverse transfer function to produce R1', G1' and B1'.
  R1', G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Looking at the bottom row in FIG. 19, the first step of processing is $$R'=Y'+1.47460 \times Cr'$$

$$G'=Y'-0.16455 \times Cb'-0.57135 \times Cr'$$

$$B'=Y'+1.88140 \times Cb'. \quad \text{(equation A2)}$$

But since Cr' and Cb' are fixed, they are interpolated, not sent, we can replace everything to the right of Y' with a constant $$R'=Y'+c1$$

$$G'=Y'+c2$$

$$B'=Y'+c3$$

The next step is taking the transfer function of the color components:

$$R=TF(R')$$

$$G=TF(G')$$

$$B=TF(B')$$

which then becomes $$R=TF(Y'+c1)$$

$$G=TF(Y'+c2)$$

$$B=TF(Y'+c3)$$

The last step of the processing is going from RGB to XYZ. This is done using $$X=0.636958 \times R+0.144617 \times G+0.168881 \times B$$

$$Y=0.262700 \times R+0.677998 \times G+0.059302 \times B$$

$$Z=0.000000 \times R+0.028073 \times G+1.060985 \times B \quad \text{(equation 4)}$$

of this we are only interested in the Y component, so we use $$Y=0.262700 \times R+0.677998 \times G+0.059302 \times B.$$

Inserting the previous equations into this gives $$Y=0.262700 \times TF(Y'+c1)+0.677998 \times TF(Y'+c2)+0.059302 \times TF(Y'+c3),$$

or shortened to $$Y=f(Y')$$

We want the output value Y of this equation to match the original $Y_O$. Since the Y depends on Y' in three different places in a nonlinear way, there seems to be no easy way to invert the function so that we can get $Y'=f^{-1}(Y)$.

However, it is possible to linearize the nonlinear $TF(x) \sim kx+m$. Doing this in the three different places gives $$Y \sim k1 \times Y'+m1+k2 \times Y'+m2+k3 \times Y'+m3$$

which is equivalent to $$Y \sim (k1+k2+k3) \times Y'+(m1+m2+m3).$$

This can be inverted to $$Y'k=(Y_O-(m1+m2+m3))/(k1+k2+k3).$$

Thus it is likely that Y'k will produce a value Yk closer to $Y_O$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_O$ value. It may be sufficient to just use a few iterations or even one iteration.

The corrected Y value resulting from a single iteration will most likely be much better than not correcting at all.

Figure 20:
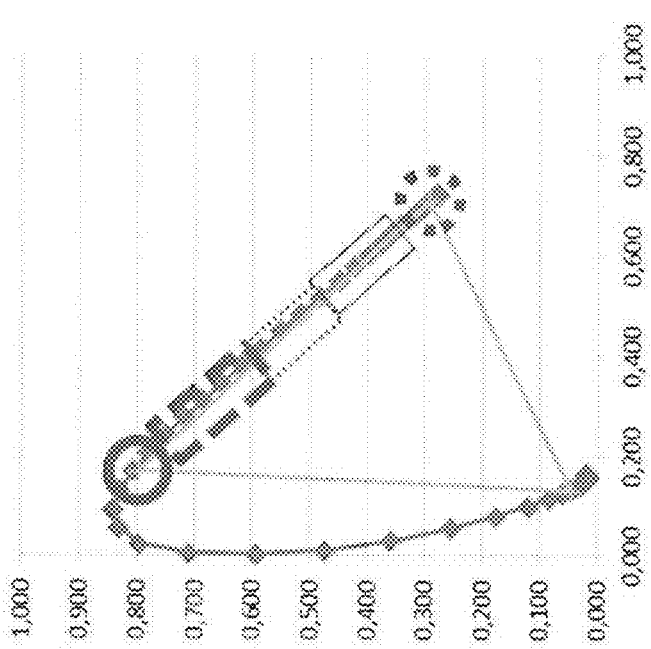
FIG. 20 is a diagram illustrating that there can be different linearizations in different color areas.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 20.

Thus, there can be different linearizations in different areas. If the color is inside the circle with a solid line, we are close to the green primary and we can use one linearization. If we are further along towards the red primary, i.e. inside the dashed box, we can use a second linearization. If we are close to the edge of the gamut and roughly half way between the red and the green primary, i.e. inside the dotted box, a third linearization can be used. If we are even closer to the red primary, i.e. inside the box with a solid line, a fourth linearization can be used. If we are inside the dotted circle, i.e. close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to 10 bits. We then need $2^{10} \times 2^{10} \times 2^{10}$ different values in our look-up table. That is equivalent to $2^{30}$ values. If each value is two bytes, this means $2^{31}$ bytes, or 2 Gb. That is big but maybe not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$$Y'=(LUT(Cb'6\ bit, Cr'6\ bit, Y6\ bit)+LUT(Cb'6\ bit+1, Cr'6\ bit, Y6\ bit))/2$$

Interpolating between more than two values is also possible.

In an embodiment, a look-up table is used for deriving the value of Y'. In one version the look-up table contains every possible value of $Y_O$, Cb' and Cr'. For 10 bit video that will result in 1024×1024×1024 entries and in some applications this size is acceptable. In another version the look-up table (LUT) is pruned, for example through rounding one or more of $Y_O$, Cb' and Cr', e.g. to 8 bits. If a pruned look-up table is used the algorithm can be extended with a refinement step that finds the best Y' starting from the Y' that was retrieved from the LUT. In a version the LUT is only used when the Cb' value and/or the Cr' value is such that Y' can become too different from $Y_O$, i.e. when the initially calculated Y' gives a linear Y value that is too different from $Y_O$, and thereby the size of the LUT can be substantially reduced since many values of Cb' and Cr' will not cause any problems.

In an embodiment, a function of $Y_O$, Cb' and Cr', e.g. a linear combination, polynomial function, exponential function, logarithmic function, trigonometric function, etc., is used for deriving Y'. The function can be defined such that for any value of $Y_O$, Cb' and Cr' the difference between Y and $Y_O$ is below a certain threshold or the difference between the derived Y' and the optimal Y' is below a certain threshold.

In an embodiment several different functions of $Y_O$, Cb' and Cr' are defined for deriving Y'. The selection of which function to use is based on the value of $Y_O$, Cb' and Cr'.

For each embodiment described herein it could be the case that the method for deriving Y' is only invoked if the difference between Y' and $Y_O$ is above a certain threshold to begin with.

Annex B

This Annex B investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30 Barten steps is possible. For P3 content in a BT.2020 container, an error of 40 Barten steps is possible.

1 Introduction

It has been noted that small changes in color can introduce surprisingly large artifacts when 4:2:0 subsampling is used, even if no compression is happening.

1.1 Cross-check Discrepancies

This investigation started as a cross-check of m35255 [1], trying to replicate the results on slide 13, reprinted in Table B1 below. The results are from a test image where the left part of the image up to pixel 95 has the color (3000, 0, 100) and the right part, pixel 96 and forward, has the color (3000, 4, 100).

TABLE B1

| | values of m35255 | | | | | |
|---|---|---|---|---|---|---|
| 4:2:0 10 bits | 94 | 95 | 96 | 97 | 98 | 99 |
| EXR RGB in YCbCr | 3000 | 3000 | 3000 | 3000 | 3000 | 3000 |
| | 0 | 0 | 4 | 4 | 4 | 4 |
| | 100 | 100 | 100 | 100 | 100 | 100 |
| | 258 | 258 | 404 | 404 | 404 | 404 |
| | 650 | 650 | 640 | 640 | 570 | 570 |
| | 882 | 882 | 870 | 870 | 787 | 787 |

TABLE B1-continued

| | | | values of m35255 | | | |
|---|---|---|---|---|---|---|
| implied | 258 | 258 | 401 | 404 | 404 | 404 |
| YCbCr | 650 | 649 | 642 | 604 | 570 | 566 |
| | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (n14548, [2]) we got the result shown in Table B2. For downsampling, the filters described in Section 2.4.7 of [2] was followed (2 and 3 taps) and for upsampling Section 2.4.8 of [2] was followed (4 tap filters).

TABLE B2

| | | | values when trying to crosscheck | | | |
|---|---|---|---|---|---|---|
| 4:4:4 | 94 | 95 | 96 | 97 | 98 | 99 |
| 10 bits | | | | | | |
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 | | 580 | | 570 | |
| | 882 | | 799 | | 787 | |
| YCbCr | 258 | 258 | 404 | 404 | 404 | 404 |
| after unsampling | 650 | 616 | 580 | 571 | 570 | 569 |
| | 882 | 841 | 799 | 788 | 787 | 786 |
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table B3.

TABLE B3

| | | | values when moving the discontinuity | | | |
|---|---|---|---|---|---|---|
| 4:4:4 | 94 | 95 | 96 | 97 | 98 | 99 |
| 10 bits | | | | | | |
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 | | 640 | | 570 | |
| | 882 | | 870 | | 787 | |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table B3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in m35255 [1]. To confirm that the newer version of HDRtools (revision 573) is correct we have independently implemented the processing chain in Matlab and we get the same results as in Table B3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ). This affects the end result. As an example a float of 3007.9 will be converted to 3006.0, even though 3008.0 is a much closer value. To get a match we made the Matlab code emulate the floor( )-type conversion in the current revision of HDRtools (revision 587 of [3]).

1.3 Color Outliers

Note that even if pixel 96 is no longer an extreme outlier, pixel 97 is still quite far from correct: (5860, 2.58, 199)

instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input ExR image and the output ExR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in m35255 [1].

Running this program gave the answer that having the color (2142, 0, 138) in the left part and (2142, 4, 138) in the right part gives the largest visible error, as shown in Table B4. The optimization software that looks for the "worst" error is not guaranteed to find the global maximum, hence even worse positions in the color gamut may exist.

TABLE B4 data for the "worst" color for 4:2:0 subsampling

| pixel 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0 | 3993.7333<br>2.4265<br>263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

Figure 21:
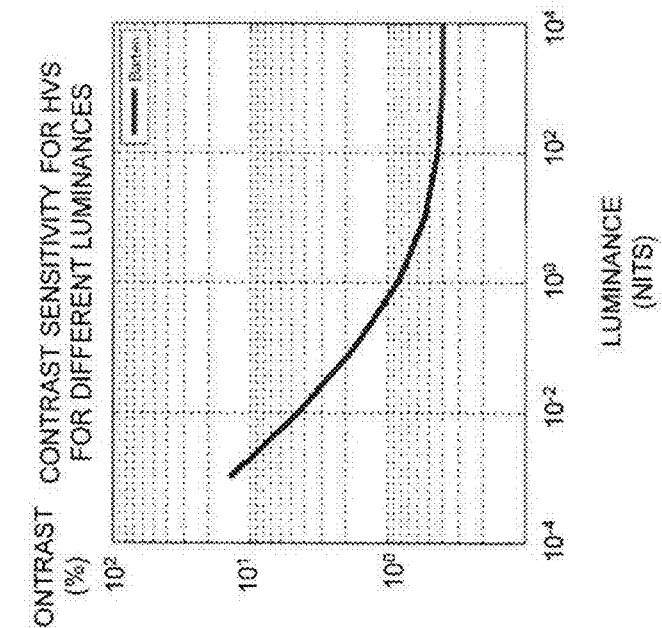
FIG. 21 illustrates Barten's curve for contrast sensitivity.

As can be seen in Table B4, the relative error for RGB 4:4:4 is 0.0304%. To put that in perspective, we compared that with Barten's curve, see FIG. 21 illustrating Barten's curve for contrast sensitivity. A contrast below the curve is not noticeable. Table B5 shows the values used for plotting the curve in FIG. 21.

TABLE B5 values used for plotting the Barten's curve

| Luminance in cd/m² | Contrast (%) |
|---|---|
| $10^{-3}$ | 13.8294 |
| $10^{-2}$ | 4.5454 |
| $10^{-1}$ | 1.7461 |
| $10^{0}$ | 0.8507 |
| $10^{1}$ | 0.5454 |
| $10^{2}$ | 0.4360 |
| $10^{3}$ | 0.4027 |
| $10^{4}$ | 0.3962 |

As can be seen in FIG. 21, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in m35255 [1], which also pointed out colors on the gamut edge as problematic.

1.4 when Input is 709 Data

Figure 22:
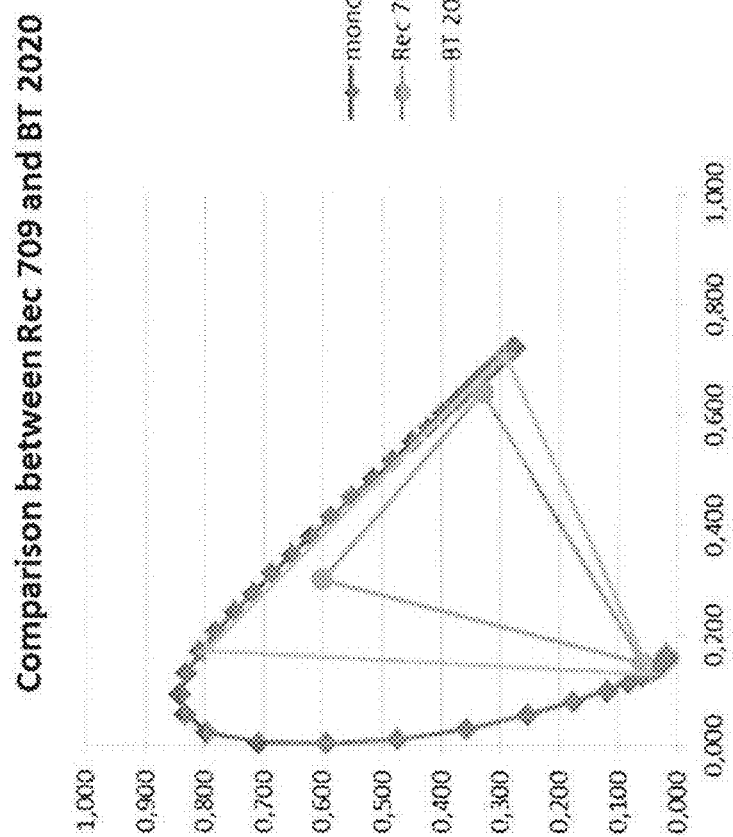
FIG. 22 illustrates a comparison between Rec709 and BT.2020 color gamuts.

The data presented in Table B1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 22. It is therefore reasonable to assume that the relative error will be smaller.

We have run the optimization software to find the Rec709 color that, after conversion to BT.2020, would result in the largest relative error. The resulting two colors are (0, 0, 50) for the left part of the screen and (2, 3, 49) in the right part. This is presented in Table B6.

TABLE B6 data for the "worst" color for 4:2:0 subsampling if input is Rec709 and container format is BT.2020

| pixel 97 | RGB value | Y value | Y diff | relative error | Barten steps |
|---|---|---|---|---|---|
| original Rec709 color | 2<br>3<br>49 | | | | |
| original BT.2020 color | 4.3650<br>3.4535<br>44.1810 | 6.1082 | | | |
| RGB 4:4:4 | 4.3793<br>3.4293<br>43.7035 | 6.0672 | 0.0401 | 0.6711% | 1.2305 |
| RGB 4:2:0 | 4.4055<br>2.9939<br>63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 22.

1.5 When Input is P3 Data

The same test can be carried out for P3 source data contained in a BT.2020 container. The worst colors are then (2.48, 3.32, 4.63) and (3.29, 0, 6.71), as shown in Table B7.

TABLE B7 data for the "worst" color for 4:2:0 subsampling if input is P3 and container format is BT.2020

| pixel 97 | RGB value | Y value | Y diff | relative error | Barten steps |
|---|---|---|---|---|---|
| original P3 color | 3.29<br>0<br>6.71 | | | | |
| original BT.2020 color | 2.7993<br>0.2342<br>6.5960 | 1.2853 | | | |
| RGB 4:4:4 | 2.8099<br>0.2304<br>6.4838 | 1.2788 | 0.0065 | 0.5062% | 0.5951 |
| RGB 4:2:0 | 1.4911<br>0.3834<br>3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 cd/m$^2$, which equals 0.85%.

1.6 Conclusion

This Annex has investigated the error in luminance due to 4:2:0 subsampling. Although we have not been able to match the worst outlier from m35255 [1], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content

[2] International Organization for Standardization, ISO/IEC JTC1/SC29/WG11, Coding of moving pictures and audio, MPEG2014/N14548, July 2014, Sapporo, Japan, Luthra et al., Test sequences and anchor generation for HDR and Wide Gamut Content Distribution

[3] https://wg11.sc29.org/svn/repos/Explorations/XYZ/HDRTools/branches/0.9-dev

[4] International Organization for Standardization, ISO/IEC JTC1/SC29/WG11, Coding of moving pictures and audio, MPEG2014/N15083, February 2015, Geneva, Switzerland, Luthra et al., Call for Evidence (CfE) for HDR and WCG Video Coding

The invention claimed is:

1. A device for pre-processing a pixel in a picture, the device comprising processing circuitry configured to:
   subsample a linear color of said pixel in a first color space to obtain a subsampled linear color in said first color space;
   apply a first transfer function to said subsampled linear color in said first color space to obtain a subsampled non-linear color in said first color space;
   apply a first color transform to said subsampled non-linear color in said first color space to obtain at least one of a subsampled first non-linear chroma component value in a second color space and a subsampled second non-linear chroma component value in said second color space;
   derive a non-linear luma component value in said second color space for said pixel, wherein a color of said pixel is represented by said non-linear luma component value, said subsampled first non-linear chroma component value and said subsampled second non-linear chroma component value in said second color space, and wherein said processing circuitry is configured to derive said non-linear luma component value in said second color space for said pixel based on said subsampled first non-linear chroma component value in said second color space, said subsampled second non-linear chroma component value in said second color space and an original linear luminance component value in a third color space; and
   wherein said processing circuitry is further configured to:
   upsample said subsampled first non-linear chroma component value in said second color space and said subsampled second non-linear chroma component value in said second color space to obtain an upsampled first non-linear chroma component value in said second color space and an upsampled second non-linear chroma component value in said second color space;
   apply a second color transform to a candidate non-linear luma component value in said second color space, said upsampled first non-linear chroma component value in said second color space and said upsampled second non-linear chroma component value in said second color space to obtain a non-linear color in said first color space;
   apply a second transfer function to said non-linear color in said first color space to obtain a linear color in said first color space;
   apply a third color transform to said linear color in said first color space to obtain a linear luminance component value in said third color space; and
   derive said non-linear luma component value based on a comparison of said original linear luminance component value in said third color space and said linear luminance component value in said third color space.

2. The device according to claim 1, wherein said processing circuitry is configured to select a candidate non-linear luma component value in said second color space that reduces a difference between said original linear luminance component value in said third color space and said linear luminance component value in said third color space.

3. The device according to claim 2, wherein said processing circuitry is configured to:
   perform application of said second color transform to a respective candidate non-linear luma component value in said second color space, said upsampled first non-linear chroma component value in said second color space and said upsampled second non-linear chroma component value in said second color space, application of said second transfer function to said non-linear color in said first color space and application of said third color transform to said linear color in said first color space for different candidate non-linear luma component values in said second color space; and select the candidate non-linear luma component value among said different candidate non-linear luma component values in said second color space that results in a smallest difference between said original linear luminance component value in said third color space and said linear luminance component value in said third color space.

4. The device according to claim 1, wherein said processing circuitry is configured to perform a binary search to select a candidate non-linear luma component value in said second color space that minimizes a difference between said original linear luminance component value in said third color space and said linear luminance component value in said third color space.

5. A device for pre-processing a pixel in a picture, the device comprising processing circuitry configured to:
- subsample a linear color of said pixel in a first color space to obtain a subsampled linear color in said first color space;
- apply a first transfer function to said subsampled linear color in said first color space to obtain a subsampled non-linear color in said first color space;
- apply a first color transform to said subsampled non-linear color in said first color space to obtain at least one of a subsampled first non-linear chroma component value in a second color space and a subsampled second non-linear chroma component value in said second color space; and
- derive a non-linear luma component value in said second color space for said pixel, wherein a color of said pixel is represented by said non-linear luma component value, said subsampled first non-linear chroma component value and said subsampled second non-linear chroma component value in said second color space; and wherein said processing circuitry is further configured to:
- apply a third color transform to said linear color in said first color space to obtain a linear luminance component value in a third color space;
- apply a fourth color transform to said subsampled linear color in said first color space to obtain a subsampled non-linear representation of chrominance in a fourth color space;
- upsample said subsampled non-linear representation of chrominance in said fourth color space to obtain an upsampled non-linear representation of chrominance in said fourth color space;
- apply a fifth color transform to said linear luminance component value in said third color space and said upsampled non-linear representation of chrominance in said fourth color space to obtain a linear reference color in said first color space;
- apply said first transfer function to said linear reference color in said first color space to obtain a non-linear reference color in said first color space;
- apply said first color transform to said non-linear reference color in said first color space to obtain a first non-linear chroma reference component value in said second color space and a second non-linear reference chroma component value in said second color space;
- upsample said subsampled first non-linear chroma component value in said second color space and said subsampled second non-linear chroma component value in said second color space to obtain an upsampled first non-linear chroma component value in said second color space and an upsampled second non-linear chroma component value in said second color space;
- calculate a first chroma difference between said first non-linear chroma reference component value in said second color space and said upsampled first non-linear chroma component value in said second color space and a second chroma difference between said second non-linear chroma reference component value in said second color space and said upsampled second non-linear chroma component value in said second color space;
- subsample said first chroma difference and said second chroma difference to obtain a subsampled first chroma difference and a subsampled second chroma difference; and
- add said subsampled first chroma difference to said subsampled first non-linear chroma component value in said second color space to obtain an updated subsampled first non-linear chroma component value in said second color space and said subsampled second chroma difference to said subsampled second non-linear chroma component value in said second color space to obtain an updated subsampled second non-linear chroma component value in said second color space.

6. The device according to claim 5, wherein said processing circuitry is configured to derive said non-linear luma component value in said second color space for said pixel based on said subsampled updated first non-linear chroma component value in said second color space, said subsampled updated second non-linear chroma component value in said second color space and an original linear luminance component value in a third color space.

* * * * *